United States Patent [19]

Saito et al.

[11] Patent Number: 5,383,076
[45] Date of Patent: Jan. 17, 1995

[54] MAGNETIC HEAD DEVICE WITH CLEANING MEANS FOR CLEANING SLIDING SURFACE THEREOF

[75] Inventors: Akio Saito, Kawagoe; Hideyuki Ikeda, Yamagata, both of Japan

[73] Assignees: Pioneer Electronic Corp.; Mitsumi Electric Co., Ltd., Japan

[21] Appl. No.: 936,093

[22] Filed: Aug. 26, 1992

[30] Foreign Application Priority Data

| Sep. 6, 1991 | [JP] | Japan | 3-254440 |
| Dec. 5, 1991 | [JP] | Japan | 3-100037[U] |
| Dec. 5, 1991 | [JP] | Japan | 3-100355[U] |
| Dec. 5, 1991 | [JP] | Japan | 3-100493[U] |
| Dec. 5, 1991 | [JP] | Japan | 3-100494[U] |
| Dec. 5, 1991 | [JP] | Japan | 3-100495[U] |

[51] Int. Cl.⁶ .............................. G11B 5/41
[52] U.S. Cl. .................................. 360/128
[58] Field of Search .................. 360/128, 129; 15/DIG. 12, DIG. 13

[56] References Cited

U.S. PATENT DOCUMENTS

| 3,964,104 | 6/1976 | Herron et al. | 360/128 |
| 4,967,301 | 10/1990 | Lopez et al. | 360/128 |

FOREIGN PATENT DOCUMENTS

| 2351527 | 4/1974 | Germany | 360/128 |
| 2423288 | 11/1975 | Germany | 360/128 |
| 21608 | 6/1973 | Japan | 360/128 |
| 7087 | 2/1976 | Japan | 360/128 |
| 19855 | 5/1976 | Japan | 360/128 |
| 2108214 | 4/1990 | Japan | 360/128 |
| 314805 | 11/1990 | Japan | 360/128 |
| 3147502 | 6/1991 | Japan | 360/128 |
| 4216354 | 6/1992 | Japan . |  |

Primary Examiner—John H. Wolff
Assistant Examiner—William R. Korzuch
Attorney, Agent, or Firm—Andrus, Sceales, Starke & Sawall

[57] ABSTRACT

A magnetic head has a sliding surface including a sliding portion for sliding on a magnetic recording medium. A head holder has a head holding portion for holding the magnetic head, and at least one guiding portion located in a side of and far apart from the magnetic head fixed on the holding portion. The guiding portion guides a running course of the magnetic recording medium, and the head holding portion and guiding portion are integral with the head holder. A cleaning device is provided with the head holder so as to be pivotable, and when the cleaning device is pivoted it slides so as to clean the sliding surface of the magnetic head.

9 Claims, 25 Drawing Sheets

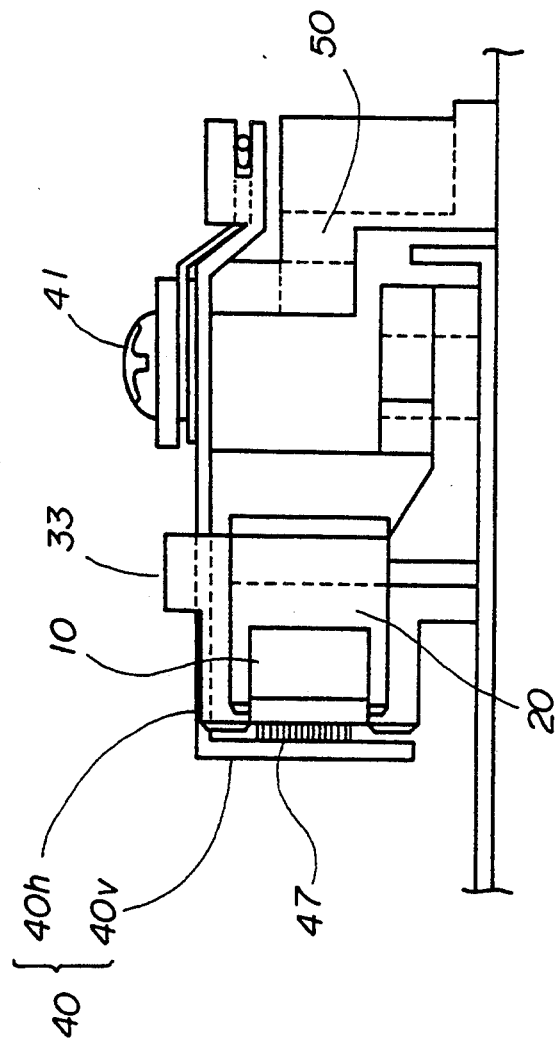

117

117

MAGNETIC HEAD DEVICE WITH CLEANING MEANS FOR CLEANING SLIDING SURFACE THEREOF

BACKGROUND OF THE INVENTION

The present invention relates to a magnetic head device and more particularly to a magnetic head device applied to a magnetic tape recording and/or reproducing apparatus and other magnetic recording medium apparatus, and a means for cleaning a sliding surface of a magnetic head which is provided in the magnetic head device.

A recording medium runs on such sliding surface of the magnetic head while a sliding portion of the sliding surface slides on the recording medium while recording or reproducing data on it. An object such as dust and/or magnetic dust can adhere on the sliding surface of the magnetic head. Such dust is produced as a result of friction of the sliding portion with the recording medium, this friction being caused during such sliding. Another cause of such dust is that such dust is carried from outside by adhering to the recording medium.

Leaving such dust on the sliding surface, particularly leaving such dust on a magnetic gap provided on the sliding surface of the magnetic head, may degrade a recording and/or reproducing performance of the magnetic head. Further, a head core, which constitutes the magnetic head, and the recording medium are scraped as a result of sliding the head core on the recording medium with such dust between them. This scraping can result in reducing their life cycles.

Thus, it is necessary to keep the sliding surface clean at all time. For this purpose, such treatment as scouring such dust off by means of a finger with cloth wound on the finger, has been performed. However, there is such a type of a recording and/or reproducing apparatus as applied to a car audio system, which system is made to be so compact in construction as to be appropriate for limited space in a car. It is hard to scour a sliding surface of a magnetic head of a magnetic head device integrated into such a recording and/or reproducing apparatus as for the car audio system, because it is hard to insert a finger in to reach the sliding surface of the magnetic head, which is included such a compact construction. Therefore, it is necessary to utilize a cleaning tape or a cleaning brush for cleaning of a sliding surface of a magnetic head periodically, both of which are made particularly for this cleaning.

Another method of keeping clean of a sliding surface of a magnetic head device has been known. This method is that a cleaning means is integrated in a magnetic head device itself. A sliding surface of it is cleaned automatically by utilizing an operation of a recording and/or reproducing apparatus such as a driving operation of a recording medium or an inserting or ejecting operation of a cassette of the recording medium (magnetic tape) in the cleaning means.

The Japanese Utility Model Application No. 51-19855, for example, discloses such a cleaning means wherein a cleaning member provided on a nose of a pivoting arm slides on a sliding surface of a magnetic head device automatically so as to clean the sliding surface. The pivoting arm is driven because an inserting or ejecting operation of a cassette of a magnetic tape is utilized for driving it.

Substantially the same method as the above mentioned method is also disclosed in the Japanese Published Utility Model Application No. 48-21608, and one of the applicants of this application also disclosed substantially the same method as the above mentioned method in the Japanese Published Utility Model Application No. 51-7087.

A problem involved in the above mentioned method is described below. The problem is caused by a pushing action of a cleaning member such as a brush or felt cloth onto a sliding surface of a magnetic head device. This action is performed while the cleaning member provided on a nose of a pivoting arm slides on the sliding surface as a result of pivoting action of the pivoting arm. A position of the magnetic head in a recording and/or reproducing apparatus can be displaced with respect to a running course of a magnetic recording medium as a result of the above mentioned action. This displacement of the position of the magnetic head can disable the magnetic recording medium from running on a magnetic gap provided on a sliding surface of the magnetic head in a precise course. As a result of this, a precise recording and/or reproducing of data on the recording medium can be disabled, and this can cause degradation of an audio quality or image quality.

A certain rectification is necessary if such displacement of the magnetic head, and particularly displacement of a head core of the magnetic head, or variation of an angle of a magnetic gap of the magnetic head, occurs with respect to the running course of the magnetic recording medium. This rectification is called azimuth adjustment and is necessary to have a high accuracy in a rectification of a head core position or a magnetic gap angle. Such an azimuth adjustment involves a special operation, in which highly accurate instruments and tools are used, and cannot be performed easily by a normal user.

SUMMARY OF THE INVENTION

A general object of the present invention is to provide a magnetic head device wherein even if the magnetic head device comprises an automatic head cleaning means such a problem cannot cause a magnetic head to be displaced with respect to a running course of a magnetic recording medium, this displacement of the head occurring because of the automatic head cleaning means.

To achieve this general object, a magnetic head device according to the present invention comprises:
 a magnetic head having a sliding surface comprising a sliding portion for sliding on a magnetic recording medium;
 a head holder having a head holding portion for holding the magnetic head, and at least one guiding portion located in a side of and apart far from the magnetic head fixed on the holding portion, the guiding portion guiding a running course of the magnetic recording medium, and the head holding portion, and the guiding portion being integral with said head holder; and
 a cleaning means provided with the head holder so as to be pivotable, the cleaning means being pivoted, then sliding on so as to clean the sliding surface of the magnetic head.

By this construction, such displacement of the head can occur even if a cleaning member provided on a nose of a pivoting arm of the cleaning means pushes on a sliding surface of the head. This is because the cleaning means is provided on the head holder, which is integral with the guiding portion. The guiding portion guides the running course of the recording medium.

Thus, even if the magnetic head incurs a displacement because the cleaning member pushes onto the sliding surface of the head, a relative displacement of the sliding surface cannot occur. This is because a displacement of the sliding surface causes a displacement of the head holder, in which the head is fixed. Also, a displacement of the head holder results in displacement of the guiding portion of the head holder. Further, a displacement of the guiding portion results in a displacement of a running course of the recording medium. Thus, the relative displacement of the sliding surface with respect to the running course of the recording medium cannot occur.

Other objects and further features of the present invention will become more apparent from the following detailed description when read in conjunction with the accompanying drawings.

BRIEF DESCRIPTION OF THE DRAWINGS

FIG. 7 shows a side view of the above mentioned magnetic head device;

DESCRIPTION OF THE PREFERRED EMBODIMENT

Embodiments according to the present invention are not limited to magnetic head devices such as applied to a recording and/or reproducing apparatus using a audio tape as a recording medium, even if such recording and/or reproducing apparatus are embodiments described below. The embodiments according to the present invention can be a magnetic head device used for recording data into a magnetic tape such as magazine tape and video tape and/or reproducing data recorded in such a magnetic tape.

Figure 1:
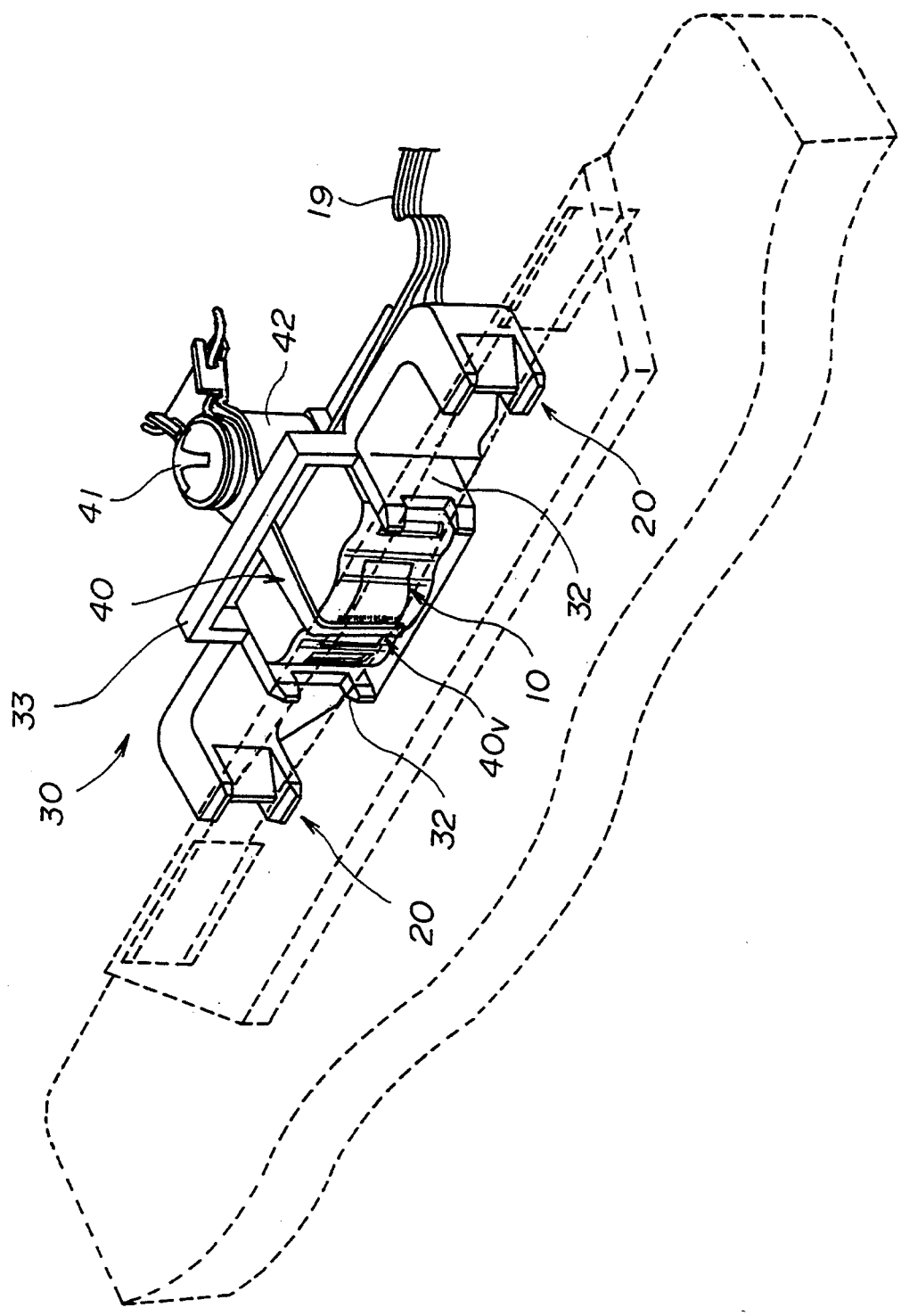
FIG. 1 shows a top, front, right side perspective view of a magnetic head device of a first embodiment according to the present invention.

A magnetic head device of a first embodiment according to the present invention is described below with reference to FIG. 1. The magnetic head device has a head holder 30. The head holder 30 has a head holding portion in which a magnetic head 10 is fixed, and two tape guides 20 and 20, which act as guiding portions, and two head guides 32 and 32. Such construction of the head holder 30 as having the head holding portion, the tape guides 20 and 20, and the head guides 32 and 32, is shown in Japanese Patent Application No. 2-314805 filed Nov. 20, 1990 by one of the applicants of the application of the present invention.

The head holder 30 further comprises a lever 40, and a brush is provided on a nose of which lever 40. The lever 40 is attached on the head holder 30 pivotable with respect to a pivot portion 41, which is a center of a pivoting action of the lever 40. The lever 40 constitutes cleaning means, and the brush provided on the nose of the lever 40 acts as a cleaning member. The brush can be replaced by felt cloth.

Figure 2:
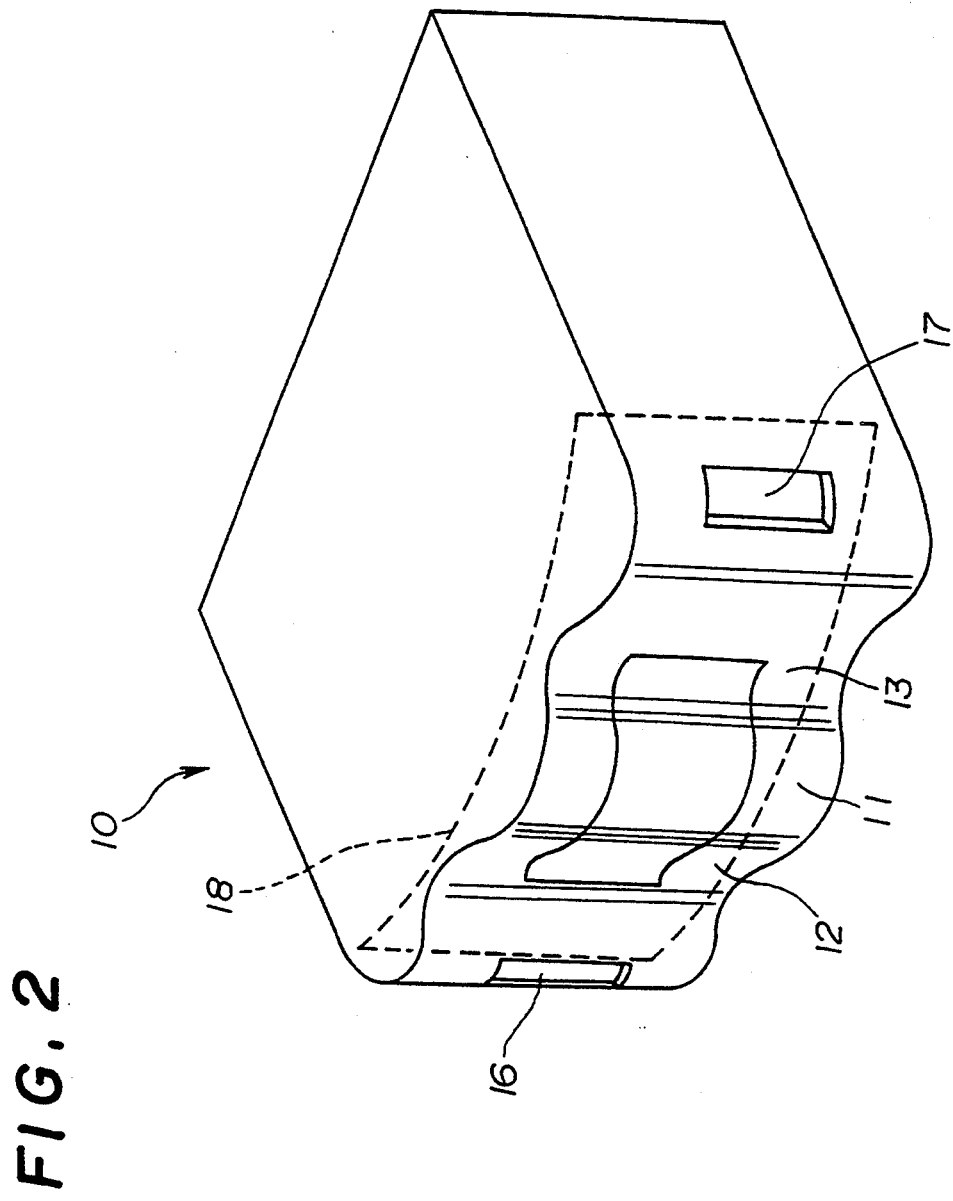
FIG. 2 shows a top, front, right side perspective view of a magnetic head fixed in a head holder of the magnetic head device of FIG. 1.

The magnetic head has a construction such as shown in FIG. 2. A surface of the magnetic head on a front side has a convex sliding surface 11, and two concavities 12 and 13 in both lateral sides of the sliding surface 11. The sliding surface has known magnetic gaps, not shown. The surface in the front side further comprises two stowage cavities 16 and 17 which act as a stowage portion in both outsides of both concavities 12 and 13. The above mentioned brush is stowed in the cavity 16 or 17. A shielding plate 18, which acts as a masking member, is provided inside of the magnetic head 10. The shielding plate 18 is made of permalloy or other metals, and it prevents electric or magnetic noise from penetrating inside the head 10.

The shielding plate 18 can further be utilized as a bottom plate for the cavities 16, 17. A lead 19, as shown in FIG. 1, is provided on a rear side of the magnetic head 10. The lead 19 is used for supply to the head 10 or extraction from the head 10 of driving electric current, energizing electric current, signal electric current, and other electric current.

Figure 3:
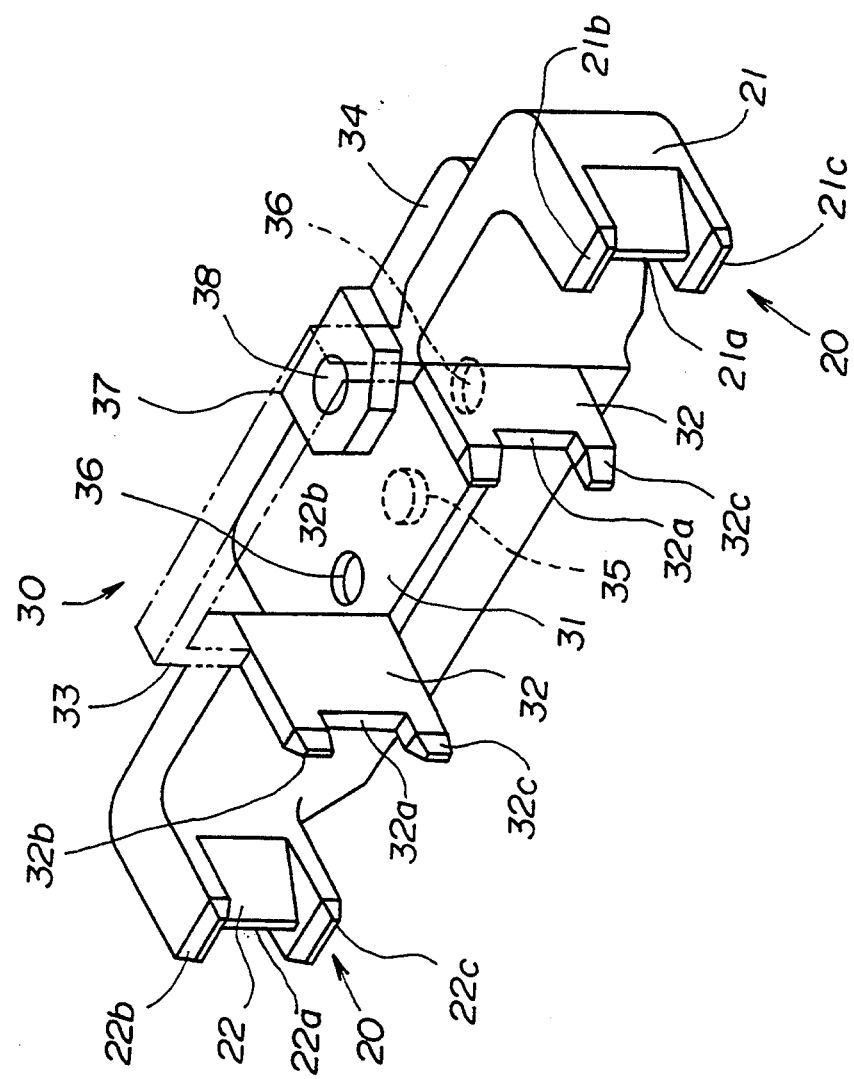
FIG. 3 shows a top, front, right side perspective view of the head holder.

The head holder 30 is integrally formed by a plastic molding method, a construction of which is shown in FIG. 3. The shape of the holder 30 is such that left and right portions extend in both directions from the above mentioned head holding portion. The above mentioned head guides 32 and 32 protrude to the front side in both lateral sides of the head holding portion. The head guides 32 and 32 guide a direction of the head 10 while the head 10 is inserted and then fixed in the head holding portion. A reinforcing portion 33 connects both right and left portions of the holder 30 in a top of the head holding portion. The reinforcing portion prevents the head guides 32 and 32 from opening to both lateral directions, and this opening to both lateral directions means that a distance between them is increased. This opening to both lateral directions of the head guides 32 and 32 occurs because of heat, stress or other functions given to the holder 30.

A fixing base 34 extends to the rear direction at the bottom of the holder 30. A positioning protuberance 35 is formed on the bottom surface of the fixing base 34, which protuberance 35 is used for ensuring a position of the holder 30 with respect to a chassis or other parts of the recording and/or reproducing apparatus. This positioning of the holder 30 can be ensured as a result of inserting of the protuberance 35 into a corresponding hole made on the chassis or the other parts of the recording and/or reproducing apparatus.

Both lateral sides of the protuberance 35 on the base 34 are provided with two fixing holes 36 and 36 which are formed so as to pass through the base 34. The base 34 is provided with a step portion 37 which is formed so that a central rear part of the base 34 is one-stepped to be higher than the other part of the base 34. A through hole 38 is formed on the step portion 37, which hole 38 is used for fixing a below mentioned shaft 42. The shaft 42 supports the above mentioned lever 40 pivotably.

The tape guides 20 and 20 comprise bent portions 21 and 22, which are bent into the front direction of both lateral sides of the holder 30. The bent portions 21 and 22 are inserted into a small window made on a front surface of a cassette of a magnetic tape while data is recorded on the magnetic tape or reproduced therefrom by means of the magnetic head 10, as shown in FIG. 1. The bent portions 21 and 22 have recessed portions 21a and 22a, widths of which correspond to a width of the magnetic tape. Each of the recessed portions 21a and 22a is formed on both sides with a respective one of top protrusions 21b and 22b and respective one of bottom protrusions 21c and 22c. The magnetic tape runs through the magnetic head in a predetermined course as a result of guidance by these protrusions 21b and 21c; and 22b and 22c.

Similar recessed portions 32a and 32a as the recessed portions 21a and 22a, each of which is defined on both sides with a respective one of top protrusions 32b and a 32b; and respective one of bottom protrusions 32c and 32c, can be provided on the head guides 32 and 32, for ensuring a relative positioning of a magnetic tape with the magnetic head 10. An important matter for this with regard to ensuring stabilized running of the magnetic tape is, to ensure linearity of the head guides 32 and 32 with the tape guides 20 and 20.

Figure 4:
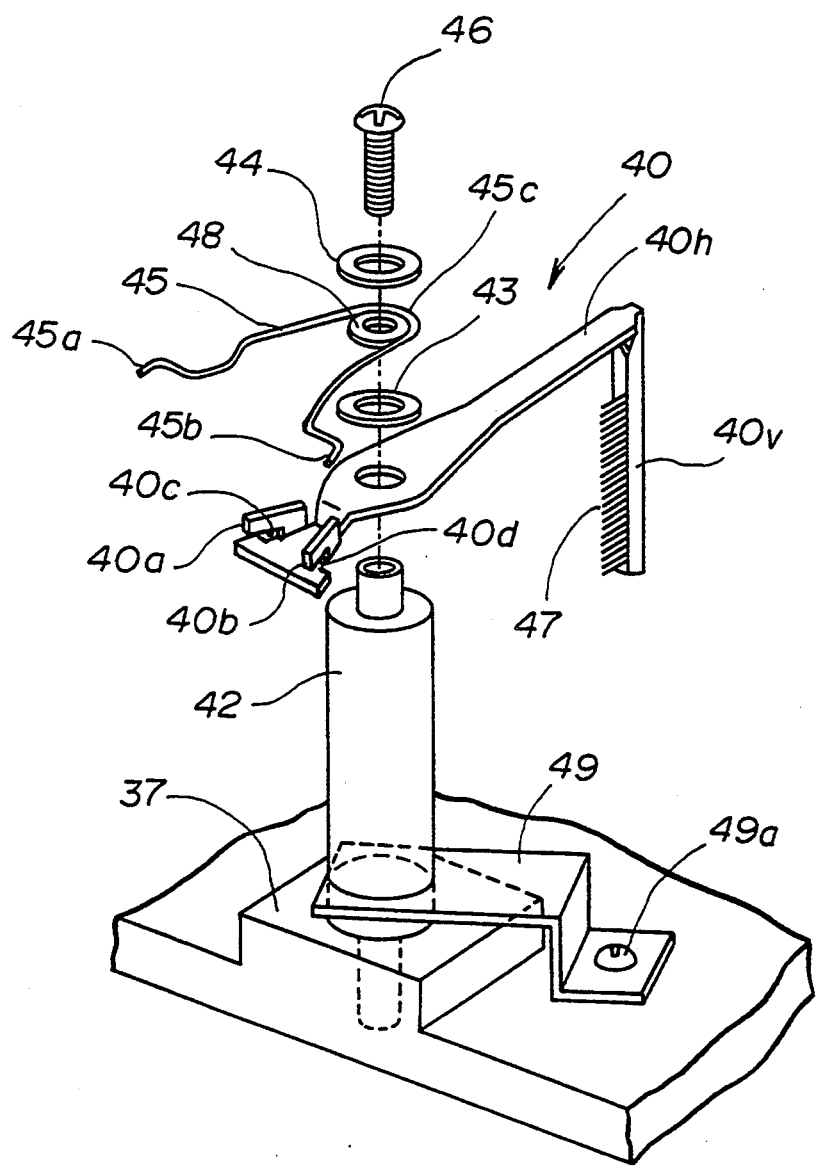
FIG. 4 shows an exploded top, rear, left side perspective view of a lever for cleaning and a pivot portion of the lever.

A construction where the lever 40 is supported pivotably on the holder 20 is described below with reference to FIG. 4. One end of the lever 40 is supported on a top end of a shaft 42, which is fixed in the through hole 38 of the step portion 37. The lever 40 has a reverse "L" shape as shown in FIG. 4 comprised of a horizontal portion 40h and a brush base 40v. The one end of the lever 40 is supported on the top end of the shaft 42 by means of a screw 46 through washers 43 and 44, a spring 45, and collar 48.

Another end than the brush base 40v of the lever 40 is shaped such that both lateral sides of the other end are bent upward so as to form ribs 40a and 40b, and indentations 40c and 40d are formed on the ribs 40a and 40b. Both ends of the spring 45 are passed through the indentations 40c and 40d.

The brush base 40v is formed on the end of the lever 40 by bending downward and then extending vertically. A brush 47 is attached on the brush base 40v. The brush 47 can be made as a result of folding a brush member in the brush base 40v. The brush member is made from bristles such as nylon fibers or carbon fibers or other fibers wound on a core material. A problem caused by an electrostatic phenomena because of a friction of the brush 47 can be prevented if materials comprising the carbon fibers are used for the bristles of the brush 47. The lever 40 extends to the front direction through a space between a top surface of the magnetic head 10 and the reinforcement portion 33 in an assembled condition, and then the brush 47 touches on the sliding surface (a front surface) of the magnetic head 10.

A material of the lever 40 preferable to prevent a performance of the magnetic head 10 from degrading is a nonmagnetic material such as an austenitic stainless steel. Further, the shaft 42, the washers 43 and 44, and the screw 46, and other associated members are made of copper, which has superior conductivity, because an electrostatic charge stored in the lever 40 can be discharged through them. A grounding member (plate) 49 is provided in a bottom portion of the shaft 42, and the grounding member 49 is fixed on the chassis of the recording and/or reproducing apparatus by means of a screw 49a. Thus the lever 40 is connected electrically with the chassis through the shaft 42, the grounding member 49, and screw 49a.

The spring 45 has a shape of approximately "U", both ends of which are bent so as to point apart from each other, and the both ends are called nose portions 45a and 45b. The nose portions 45a and 45b are inserted into the indentations 40c and 40c of the ribs 40a and 40c of the lever 40 respectively, where the spring 45 is compressed so as to minimize a distance between both nose portions 45a and 45b. Then small parts of the nose portions 45a an 45b protrude in both lateral directions from the ribs 40a and 40b. A center portion 45c of the spring 45 and the collar 48 are sandwiched by the washers 43 and 44, then the spring 45 is integrated in the lever 40 by means of screw 46.

The ribs 40a and 40b serve as stoppers for supporting the center portion of 45c of the spring 45 in a predetermined position on a top of the shaft 42. The ribs 40a and 40b also serve as force transmitting portions for being pushed by a driving member 50. The driving member 50 reciprocates along the direction of an arrow shown in FIG. 5 periodically or on demand as a result of being driven by a driving source such as a magnetic tape driving motor. Another method to drive the driving member 50 can be that a push button may be provided on a front control panel of the magnetic tape recording and/or reproducing apparatus. The driving member 50 can be driven by a force obtained as a result of an operation of the above mentioned push button.

Raised portions 51 and 52 are formed on near both lateral sides with respect to a direction of $D_1$–$D_2$ of a top surface of the driving member 50. Moving of the driving member 50 in a direction $D_1$ or a direction $D_2$ results in a force being transferred from a side wall of the raised portion 51 or 52 to the rib 40a or 40b of the lever 40. Thus the lever 40 pivots clockwise or counterclockwise with respect to the pivot portion.

In this case, the nose portion 45a or 45b of the spring 45 first touches the side wall of the raised portion 51 or 52. Thus, a force applied from the driving member 50 is absorbed by an elasticity of the spring 45 while it deforms. Then the raised portion 51 or 52 directly pushes the rib 40a or 40b, then the lever 40 begins to pivot. That is, the spring 40 acts as a shock absorbing member when the lever 40 begins to pivot, thus the spring 40 prevents a sudden pushing force from applying to the lever, then it prevents the magnetic head 10 and the head guides 32 and 32 from being damaged through the lever 40.

Figure 6:
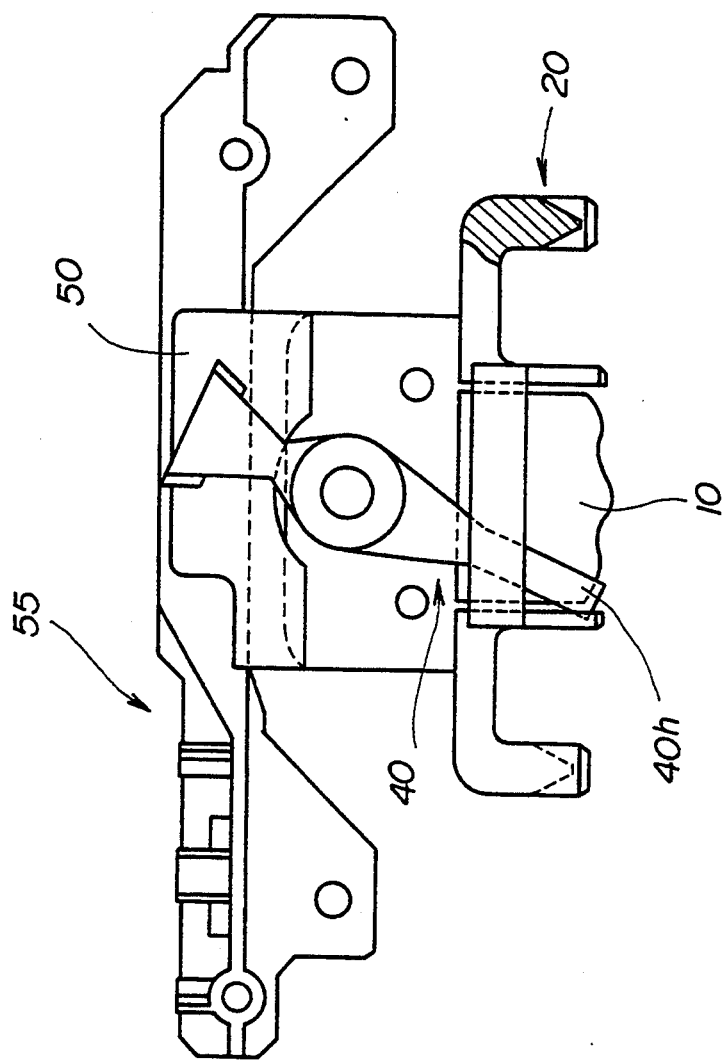
FIG. 6 shows a plan view of the magnetic head device where the magnetic head and the lever are assembled in the head holder.

FIG. 6 shows a plan view of an entire construction mentioned above including the lever 40, which is supported pivotably on the head holder 30, in which head holder 30 the magnetic head 10 is attached, and the driving member 50, which member 50 is located in a position where a rear end of the lever 40 is located. FIG. 7 shows a side view of the above mentioned entire construction. The lever 40 has the brush base 40v, which extends downward in a vertical direction from the horizontal portion 40h. The horizontal portion 40h extends in the front direction through the space between the reinforcement portion 33 and the top surface of the magnetic head 10. Further, brush 47, which is mounted on an inner surface of the brush base 40v, touches onto the front surface (sliding surface) of the magnetic head 10. A length of the lever 40 from the pivot portion 41 to a nose of the horizontal portion 40h is determined so that an arc shape drawn by the nose of the horizontal portion 40h corresponds to an arc shape of the sliding surface of the magnetic head 10.

The driving member 50 is provided with a force transferring portion 55 which is integrated into the driving member 50. The driving member 50 moves in a left or a right direction as a result of a force which is transferred to the force transferring portion 55 through a motor, a gear, or other source of the force. The driving member 50 moves in the same direction as the movement of the force transferring portion 55.

A cleaning operation in the magnetic head device mentioned above is described below.

For example, in a case where the lever pivots so as to clean the magnetic head each time when a running direction of the magnetic tape is changed (this operation will be referred to as "a direction changing operation" hereinafter), the lever 40 pivots as a process shown in FIGS. 8A through 8E.

Figure 8B:
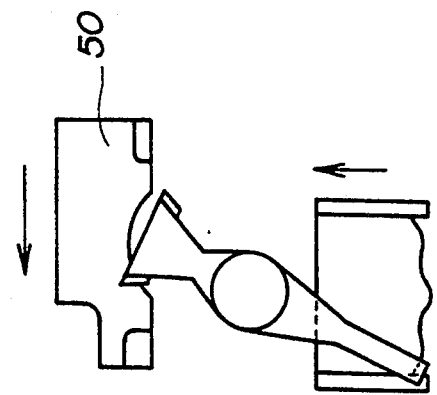
FIGS. 8A through 8F illustrate a process of lever operation in order.
Figure 8A:
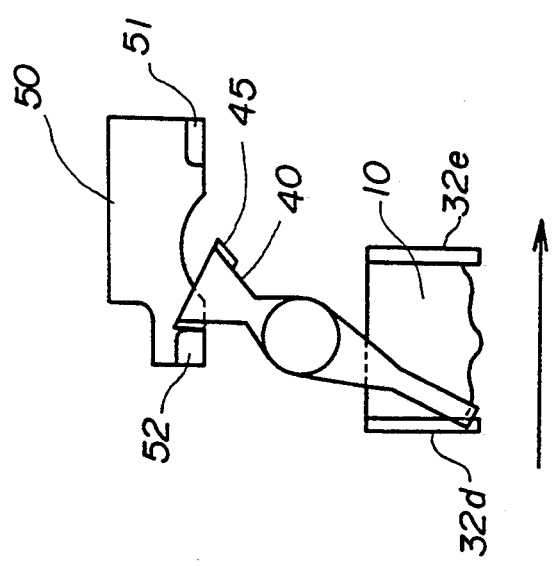

If a reproducing operation is performed in condition where the magnetic tape runs in a direction of an arrow of FIG. 8A, the lever 40 has swung in a left direction in FIG. 8A, then the brush base 40v has touched to the left side head guide 32d, and the brush 47 has been stowed in the left side brush stowage cavity 16. The magnetic head 10 has gone out toward the above mentioned small window made on the front surface of the cassette(not shown) of the magnetic tape. Thus the magnetic tape has touched a sliding portion of the sliding surface of the magnetic head 10.

Figure 8D:
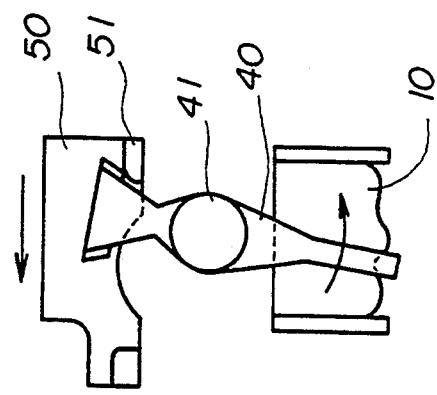
Figure 8C:
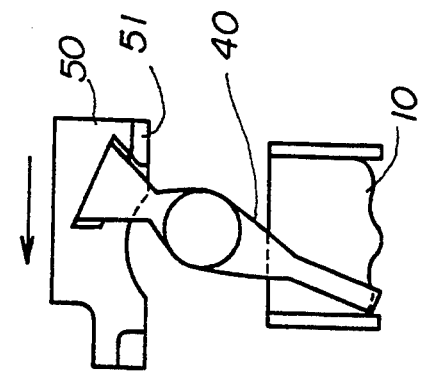

When a direction changing operation begins after the above mentioned reproducing operation, the driving member 50 moves in a left direction as shown in FIG. 8B, and the magnetic head 10 retracts from the window of the cassette after the sliding portion of the magnetic head 10 departs from the magnetic tape. The above mentioned movements of the driving member 50 and the magnetic head 10 continue until the rear end of the lever 40 touches another upheaval portion 51 as shown in FIG. 8C. This timing corresponds to the timing when the magnetic head 10 retracts from the cassette of the magnetic tape.

Figure 8F:
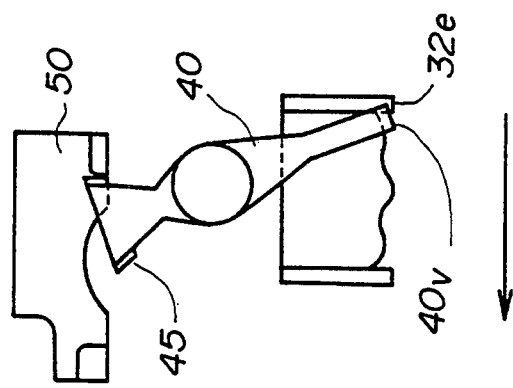
Figure 8E:
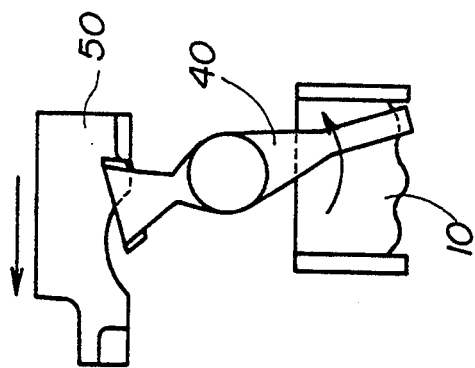

The magnetic head 10 is located in a retracted position in a condition as shown in FIG. 8C. However, the driving member 50 further continues the movement in the left direction. Then, the raised portion 51 pushes the rib 40a of the lever 40, then the portion 51 makes the lever 40 pivot in a counterclockwise direction with respect to the pivot portion 41 as shown in FIG. 8D. As a result of this pivot motion of the lever 40, the brush 47 mounted on the inner surface of the brush base 40v moves in a right direction while the brush 47 slides on the sliding surface of the magnetic head 10 as shown in FIGS. 8D and 8E. Thus, objects such as magnetic dust, dust, oil and other objects adhered on the sliding surface of the magnetic head 10 are removed.

The above mentioned pivoting motion of the lever 40 continues until the brush base 40v touches the right side head guide 32e. In this time, a shock occurring in touching the brush base 40v onto the head guide 32e is absorbed by the above mentioned shock absorbing function by means of the spring 45. The brush 47 mounted on the inner surface of the brush base 40v is stowed in the brush stowage cavity 17, which cavity 17 is provided on a right side of the sliding surface of the magnetic head 10. Then the magnetic head 10 goes out for replaying the magnetic tape in a reverse direction, and then the magnetic tape runs in a direction of an arrow shown in FIG. 8F.

As mentioned above, the cleaning operation is performed each time the direction changing operation occurs, thus the magnetic head 10, which is therefore at all times kept clean, touches the magnetic tape, thus good reproducing performance(for example, good sound reproduction) can be obtained. An experimentation has been performed such that a magnetic tape runs on a sliding surface of the magnetic head 10 where a magnetic dust is adhered by means of oil and no countermeasure has been taken for the dust, no output could be obtained from the magnetic head 10 because of the bad influence of the dust. On the other hand, after performing of the above mentioned cleaning operation once on the magnetic head 10, 80% of the output of the magnetic head 10 was recovered. After further performing the cleaning operations 10 times on the magnetic head 10 in succession, 100% of the output of the magnetic head 10 was recovered, that is, the output of the magnetic head was recovered to a condition before the dust had been adhered.

Further, after performing the above mentioned cleaning operation on the magnetic head 10 repeatedly, a deterioration of a reproduced output for a high frequency did not occur. This demonstrates that even if a displacement of a relative position of the head holder 30 with respect to the chassis, or other members associated with the body of the recording and/or reproducing apparatus occurs, this displacement does not affect at all a condition where a magnetic tape runs on the sliding surface of the magnetic head 10.

The reason of this is described below. The tape guides 20 and 20 are integrated into the head holder 30, which tape guides 20 and 20 define a running course of a magnetic tape running on the sliding surface of the magnetic head 10. Thus, a relative relationship of both positions of the tape guides 20 and 20 and the magnetic head 10 does not vary. Thus, a magnetic tape can be guided into the sliding surface of the magnetic head 10 at any time in a definite condition.

Figure 5:
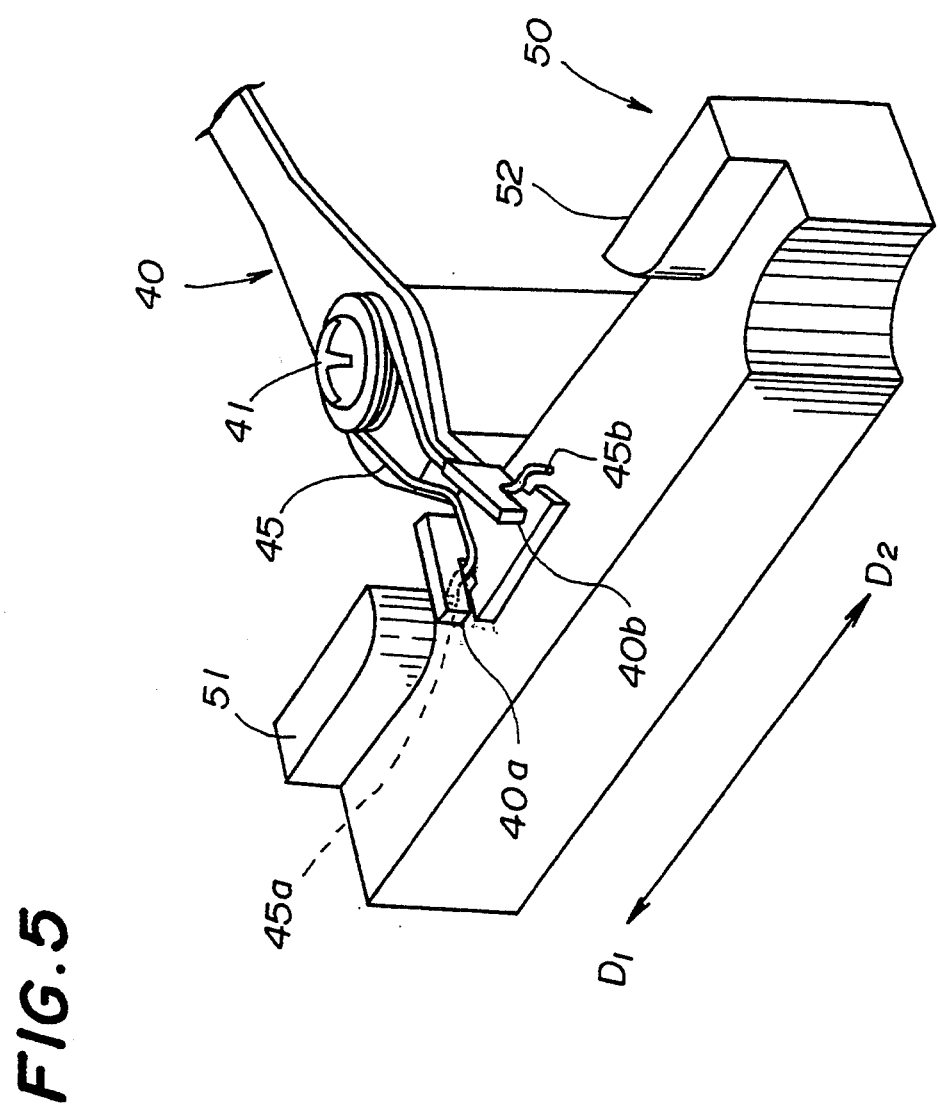
FIG. 5 shows a top, rear, left side perspective view of the lever and a driving member

A motor used for making a magnetic tape run can be also used for a driving source for driving the driving member 50 in a direction of $D_1$ or another direction $D_2$ in FIG. 5. However, the present invention is not necessary limited to using this driving source for driving the driving member 50, but another driving source other than this can be used. For example, if the magnetic head device according to the present invention is applied to a recording and/or reproducing apparatus having a motor driven type magnetic tape inserting/ejecting system, a motor for inserting/ejecting of a magnetic tape can be used for such a driving source. If the magnetic head device according to the present invention is applied to a recording and/or reproducing apparatus of automatic magnetic tape direction reversing system, a system, such that the driving member 50 is driven in changing a magnetic tape direction, can be provided. Further, a push button for manual control of the cleaning operation can be provided on a front control panel of a recording and/or reproducing apparatus.

As summarizing the particular features of the magnetic head device of the first embodiment according to the present invention, a cleaning means (the lever), which has a cleaning member (the brush) is integrated into the head holder pivotably. The head holder also has tape guides, which are also integrated into the head holder. A sliding surface (front surface) of a magnetic head is cleaned as a result of sliding of the above mentioned cleaning member on the sliding surface of the magnetic head. Thus, even if a shock, which is applied to the magnetic head device when the cleaning means of it pivots, causes some variation in a relative relationship between both positions of the head holder and a body of an apparatus, to which the magnetic head device is applied, no variation takes place in a relative relationship between both positions of the tape guides and the magnetic head. As a result of this, a magnetic tape is guided into a magnet gap, which is provided on the sliding surface of the magnetic head, in a definite condition at any time, thus good reproducing performance can be obtained.

Figure 9:
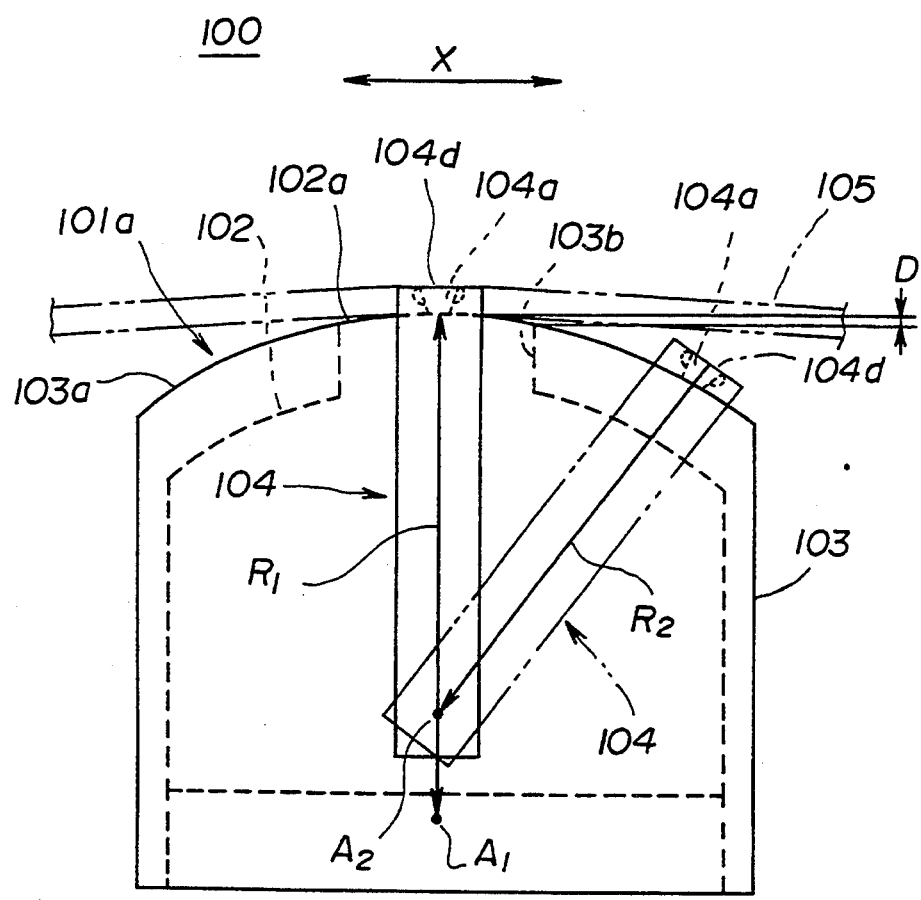
FIG. 9 shows particular features of a magnetic head device of a second embodiment according to the present invention.

Particular features of a magnetic head device of a second embodiment according to the present invention are described below with reference to FIG. 9. A magnetic head device 100 comprises a magnetic head 101a and a cleaning means 104. The magnetic head 101a comprises a head core 102 and a shielding cover 103, which covers the head core 102. The head core 102 has a gap portion 102a in a front surface thereof, which has a magnetic gap thereon and slides on a recording medium 105 so as to record data on and/or read data from the recording medium 105. The recording medium 105 runs in a direction along an arrow X in FIG. 9. The shielding cover 103 has an exposure hole 103b, which exposes the gap portion 102a of the head core 102, and a curved portion 103a located around the exposure hole 103b. The curved portion 103a has a curved shape, a radius of curvature of which curved shape is approximately the same as a radius of curvature of the gap portion 102a of the head core 102. The above mentioned cleaning means 104 is supported pivotably substantially on the magnetic head 101a, and it has a cleaning member 104a, which cleans the gap portion 102a of the head core 102.

The gap portion 102a of the head core 102 and the curved portion 103a of the shielding cover 103 constitute a sliding surface of the magnetic head 101a. The sliding surface 102a of the head core 102 has a sliding portion of the magnetic head 101a, which slides on the magnetic tape.

A distance between a center $A_2$ of pivoting of the cleaning means 104 and the gap portion 102a of the head core 102 is smaller than a distance between a center $A_1$ of curvature of the curved portion 103a of the shielding cover 103 and the gap portion 102a of the head core 102. Correspondingly, a radius $R_2$ of pivoting of the cleaning means 104 is smaller than a radius $R_1$ of curvature of the curved portion 103a of the shielding cover 103. The above mentioned two concavities 12 and 13, which are provided on the sliding surface of the magnetic head 10 of the first embodiment, are not provided on a sliding surface of a magnetic head of the second embodiment, but the sliding surface of the magnetic head of the second embodiment has a curved surface, which comprises a part of a cylindrical shape.

Because the cleaning means 104 is supported substantially on the magnetic head 101a as mentioned above and further the head core 102 is fixed in the shielding cover 103, even if the cleaning member 104a pushes the gap portion 102a of the magnetic head 102, a displacement of a position of the head core 102 does not occur. Further, because the radius $R_2$ of pivoting of the cleaning means 104 becomes small, when the cleaning member 104a, which is provided on a nose of the cleaning means 104, moves toward a left or right end of the curved portion 103a of the shielding cover 103, the cleaning member 104a becomes near the curved portion 103a of shielding cover 103.

A construction of a magnetic head device of the second embodiment according to the present invention is described below with reference to FIGS. 10 through 12.

The magnetic head device 110 comprises a magnetic head 110a and a head holder 115, in which the magnetic head 110a is attached. The magnetic head 110a comprises a head core 112 and a shielding cover 113, which covers the magnetic head. The head core 112 has a gap portion 112a, which has a magnetic gap and slides on a magnetic tape (this corresponds to the above mentioned recording medium 105) so as to record data on the magnetic tape and/or reproduce data from the magnetic tape. The magnetic tape runs in a direction along an arrow X in FIG. 10. The shielding cover 113 has an exposure hole 113b, which faces the magnetic tape and exposes the gap portion 112a of the head core 112, and a curved portion 113a, which is located around the exposure hole 113b and has a curved shape comprising a part of cylindrical shape. A radius $R_1$ of curvature of the curved shape is approximately the same as a radius of curvature of the gap portion 112a. The curved portion 113a and gap portion 112a constitute a sliding surface of the magnetic head 110a.

The head holder 115 has a lever 114 (this corresponds to the above mentioned cleaning means 104), which is supported on the head holder 115 pivotably and has a brush 114a (this corresponds to the above mentioned cleaning member 104a). The brush 114a slides on the gap portion 112a of the head core 112 so as to clean it. The head holder further has tape guides 116a and 116b, which define a running course of a magnetic tape running on the gap portion 112a of the head core 112, that is, it performs a so-called azimuth adjustment. The head holder 115 further has head guides 116c and 116d, which sandwich the magnetic head 110a so as to prevent the position thereof from displacing in a direction of the arrow X in FIG. 10. The tape guides 116a and 116b, and head guides 116c and 116d constitute a wing portion 116.

A center of curvature of the curved portion 113a of the shielding cover 113 is in parallel with a recording surface of a magnetic tape, which runs on the gap portion 112a of the magnetic head 110a, and coincides with a rectilinear line $A_1$ (a vertical direction in FIG. 11) which is perpendicular to the direction X along which the gap portion 112a of the magnetic tape runs on the magnetic head 110a. Further, a radius of curvature of the curved portion 113a is $R_1$.

A center of pivoting of the lever 114 is a rectilinear line $A_2$ parallel with the line $A_1$ and a distance between the line $A_2$ and the gap portion 112a of the magnetic head 110a is shorter than a distance between the line $A_1$ and the gap portion 112a. Correspondingly a radius $R_2$ of pivoting of the lever 114 is shorter than the above mentioned radius $R_1$ of curvature of the curved portion 113a, so that nose ends of bristles of the brush 114a may push on the gap portion 112a in a predetermined pressing force. That is, a predetermined difference of distances between $R_1$ and $R_2$ results from adding a distance between the centers $A_2$ and $A_1$, and a length in which the brush 114a shrinks when it is pressed to the gap portion 112a. $R_2$ is a distance between the center $A_2$ and the nose ends of the bristles of the brush 114a. Thus, the brush 114a is pressed to the gap portion 112a in a condition as shown in FIG. 10.

Figure 10:
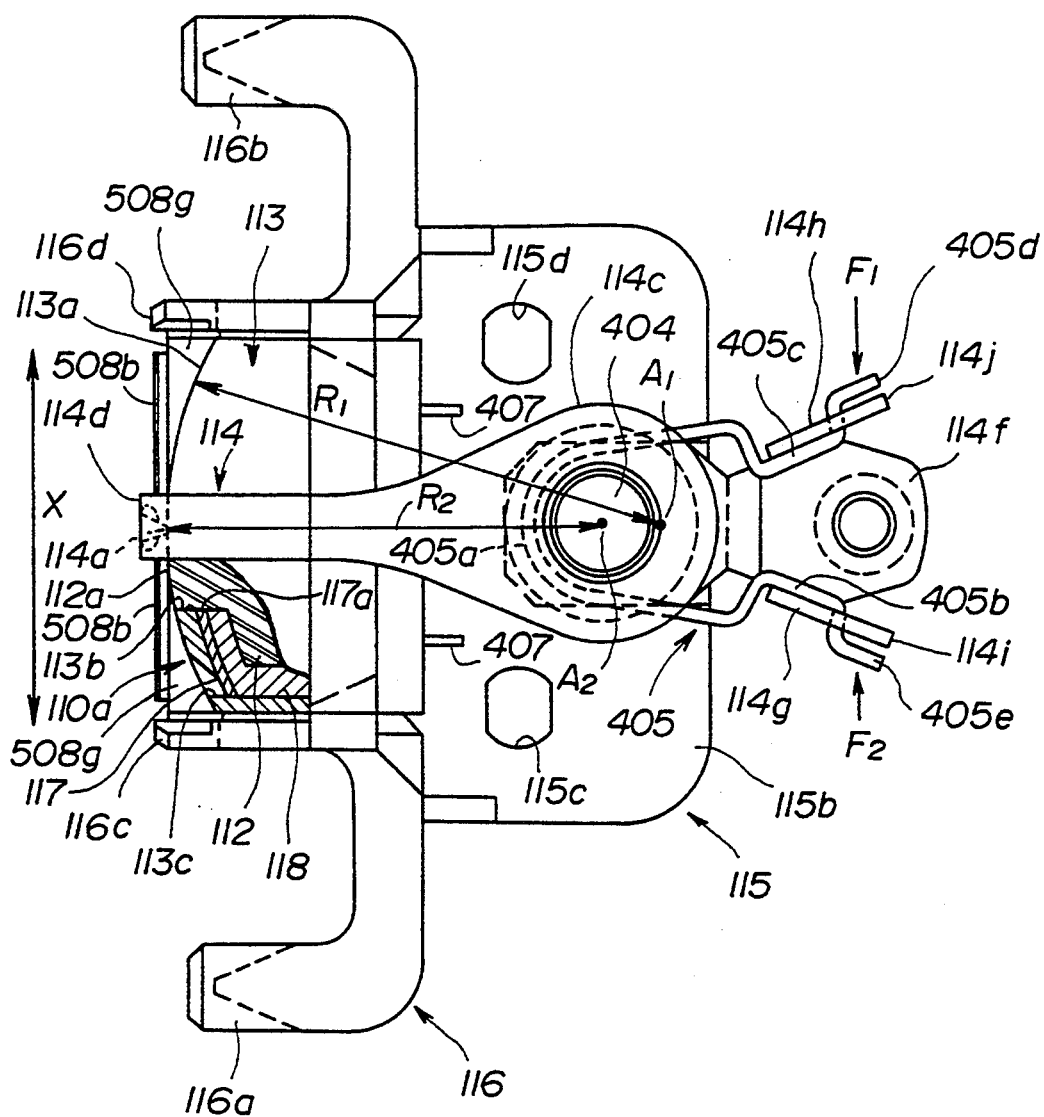
FIG. 10 shows a plan view of a magnetic head device of a second through fourth embodiments according to the present invention.

A magnetic tape as a recording medium runs along a direction of X, that is a direction between a top and bottom of FIG. 10. That is, for example, the magnetic tape runs while it is touching the tape guide 116a of the wing portion 116, the head guide 116c, the gap portion 112a, the head guide 116d, and the tape guide 116b in this order.

A construction of the tape guides 116a and 116b, and head guides 116c and 116d is substantially the same as the construction of those of the magnetic head device of the above mentioned first embodiment. Nose ends of the tape guides 116a and 116b, and the head guides 116c and 116d, where a magnetic tape runs through, are respectively cut in the same widths as the magnetic tape. These define a running course of the magnetic tape in four positions, thus the above mentioned azimuth adjustment can be surely performed.

Further, the magnetic head 110a is fixed in the head holder 115, where the tape guides 116a and 116b, and head guides 116c and 116d are integrated, and these guides 116a through 116d perform azimuth adjustment as mentioned above, further the lever 114 is supported on this head holder 115. The head core 112 is fixed in the shielding cover 113 which is an outer portion of the magnetic head 110a. Thus, even if the brush 114a is pressed to the gap portion 112a, the head core 112 is not displaced. Further, even if the head core is displaced because of a shock applied when the lever 114 is driven by an external force, a displacement of a relative position of the head core 112 or a displacement of a relative angle of the gap portion 112a does not occur. This is because the magnetic head 110a, in which the head core 112 is fixed, is fixed in the head holder 115, and the guides 116a through 116d are integrated into the head holder 115.

A construction of the head core 112 is described below. A bar shaped core made of a magnetic material is bent so as to form loop where both ends thereof face each other. This facing portion of both ends of the core constitutes the gap portion 112a. The gap portion 112a has a magnetic gap. A coil is wound on an opposite side of the loop shaped core.

The head core 112, which has the above mentioned construction, is fixed inside of the shielding cover 113 through a core holder 118. The core holder 118 is made of a cast zinc material in this embodiment, and it is provided between an inner surface shielding cover 113 and an outer surface of the head core 112, thus it serves for positioning of the head core 112.

The above mentioned exposure hole 113b has approximately the same shape as an outer shape of the gap portion 112a of the head core 112, so that a space between the outer shape of the gap portion 112a and the inner shape of the exposure hole 113b becomes very small when the gap portion 112a is fitted in the exposure hole 113b. Further, a small part of the gap portion 112a protrudes from the exposure hole 113b, that is, it protrudes in comparison with the curved portion 113a.

In an assembling stage of the magnetic head device 110, the head core 112a having the above mentioned construction is fitted in the shielding cover 113 through the core holder 118 so that the gap portion 112a is fitted in the exposure hole 113b. Then molten plastic is injected into a space made between the inner surface of the shielding cover 113 and the outer surface of the head core 112 so as to fix the head core 112 in the shielding cover 113 by a plastic molding method, and this plastic molding prevents an undesirable object from penetrating.

After completion of this fixing by the plastic molding method, the gap portion 112 protruded from the exposure hole 113b of the shielding cover 113 and the curved portion 113a are abraded together so that a border line between the gap portion 112a and curved portion 113a becomes smooth surface, that is, both surfaces becomes identical. Thus, both surfaces constitute a curved shape, which comprises a part of a cylindrical shape, a center of which coincides with the above mentioned line $A_1$.

Because of the above mentioned construction of the gap portion 112a and the curved portion 113a, a magnetic tape slides on these surfaces 112a and 113a smoothly, thus damaging of the magnetic tape does not occur even if the magnetic tape engages with the border line between both surfaces 112a and 113a.

As mentioned above in the description of the first embodiment according to the present invention with reference to FIGS. 8A through 8F, the lever 114 is driven in a left or right direction, thus dust, magnetic dust, or other undesirable object adhered onto the gap portion 112a are removed by means of the brush 114a.

After completion of the above mentioned cleaning operation, the lever should escape to a left or right side for keeping a running course of a magnetic tape on the gap portion 112a and the curved portion 113a. The radius $R_2$ of pivoting of the nose ends of the bristles of the brush 114a is shorter than $R_1$ of curvature of the curved portion 113a in the above mentioned predetermined difference of distances. Thus, when the brush 114a moves to a left or right side from the gap portion 112a, the brush 114a gradually becomes nearer the curved portion 113a.

Thus, comparing with a case, which is assumed, where the center $A_1$ and radius $R_1$ of curvature of the curved portion 113a respectively coincides with the center $A_2$ and radius $R_2$ of pivoting of the lever 114, a brush base 114d of the lever 114, where the brush 114a is provided, becomes farther apart from a magnetic tape running on the gap portion 112a in the construction of the first embodiment when the brush base 114d escapes toward the left or the right side from the gap portion 112a.

Thus, when the brush base 114d escapes toward the left or right side from the gap position 112a, a back portion, that is, a left end in FIG. 10 of the brush base 114d is apart far from a running course of the magnetic tape, which runs on the gap portion 112a and guided by the guides 116a through 116d. Thus, engaging of the magnetic tape with the back portion of the brush base 114d is prevented. Therefore, smooth running of the magnetic tape on the gap portion 112a and the curved portion 113a can be ensured, stabilized sliding of the magnetic tape on the gap portion 112a, a phase displacement and other undesirable phenomena does not occur, and damaging of the magnetic tape does not occur. As a result of this, a good performance of recording data on the magnetic tape and/or reproducing data from the magnetic tape is ensured.

This effect can be obtained by another method as described below. For example, it can be assumed that the radius $R_1$ of curvature of the curved portion 113a may be shortened. However, if the above mentioned construction is applied, a radius of curvature of the gap portion 112a should be shortened correspondingly. Thus, a distance corresponding to a distance D in FIG. 9, that is, a distance of the gap portion 112a measured by viewing from a direction X, should elongate correspondingly. This elongation of the distance D may cause an increase of electrically or magnetically induced noise penetrating into the magnetic head 110a. As a result of this, a problem may occur in which a performance of the magnetic head 110a is degraded.

Other methods for obtaining the above mentioned effect can be assumed as mentioned below. A lateral width of the shielding cover 113 is elongated, or a lateral moving width of the lever 114 is elongated. However, these methods result in an elongation of an outer dimension of the shielding cover 113, or enlargement of a space needed for an entire magnetic head device 110, which space includes the above mentioned lateral moving width of the lever 114. This elongation or enlargement can disable a miniaturization of a recording and/or reproducing apparatus, which employ the magnetic head device.

The magnetic head device of the second embodiment according to the present invention enables an effect such that the back portion of the brush base 114d is apart far from a running course of a magnetic tape without causing the above mentioned problems.

Advantages obtained by the above mentioned second embodiment according to the present invention are described below as a result of summarizing. A performance of the magnetic head can be ensured because a position of the head core is not displaced during the cleaning operation by means of the cleaning means. Further, the lever of the cleaning means does not touch a recording medium while the recording medium is running on the gap portion of the head core. Thus, a magnetic head device can be provided such that no damaging of the recording medium can occur and good performance of the magnetic head can be ensured.

Figure 13:
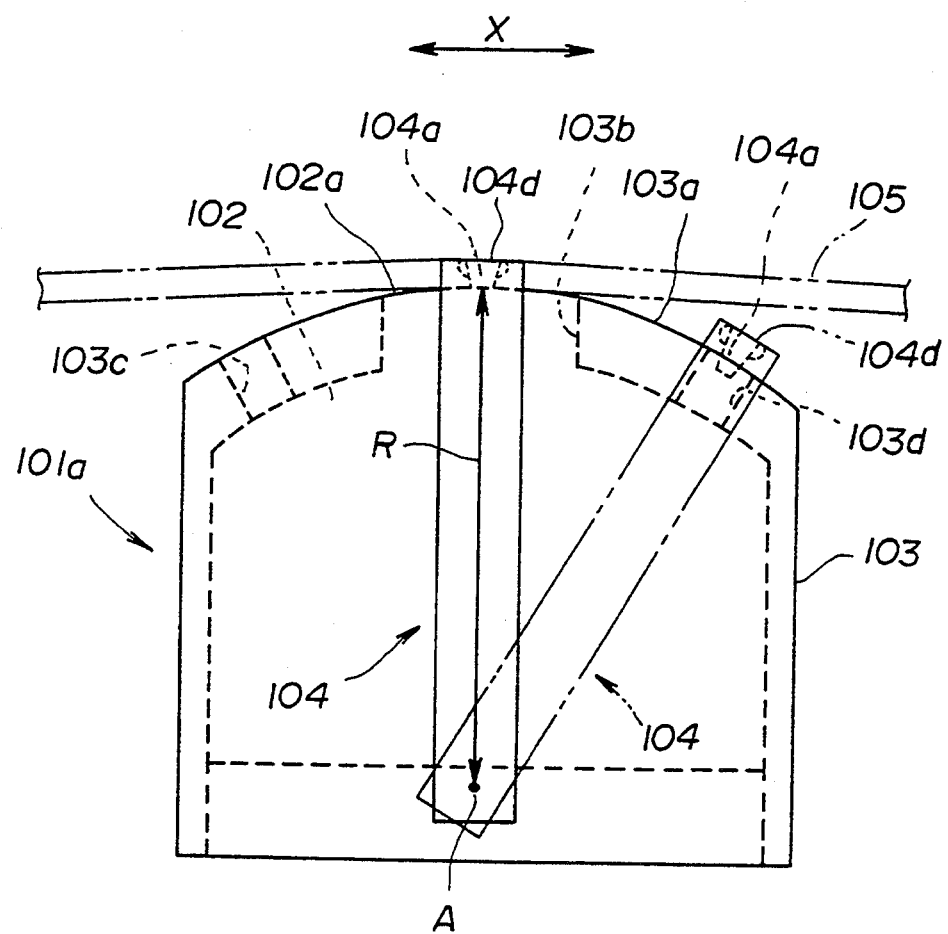
FIG. 13 shows particular features of a magnetic head device of a third embodiment according to the present invention.

Particular features of a magnetic head device of a third embodiment according to the present invention are described below with reference to FIG. 13. The magnetic head device of the third embodiment results from modifying the magnetic head device of the second embodiment. Different points of the magnetic head device of the third embodiment from the magnetic head device of the second embodiment are described below.

The center $A_1$ of curvature of the gap portion 102a of the head core 102 coincides with the center $A_2$ of pivoting of the cleaning means 104. Thus, both centers $A_1$ and $A_2$ respectively are referred to by A.

Stowage portions 103c and 103d are provided on the curved portions 103a of the shielding cover 103, which stowage portions 103c and 103d are used for stowing the cleaning member 104a therein.

A description for parts substantially the same as the corresponding parts in the second embodiment will be omitted, which parts are given the same numerals as ones of the corresponding parts of the second embodiment except for the above mentioned different points.

Such construction that the cleaning member 104a is stowed in the stowage portion 103c or 103d as mentioned above prevents the cleaning member 104a from being pressed to the curved portion 103a unless the cleaning means is pivoting. Thus deformation caused by the cleaning member 104a being pressed is prevented.

A construction of the magnetic head device of the third embodiment according to the present invention is described below with reference to FIGS. 10 through 12, which are used for the description of the second embodiment.

The third embodiment results from modifying the second embodiment as mentioned above, thus a description for parts substantially the same as the corresponding parts in the second embodiment will be omitted, which parts are given the same numerals as ones of the corresponding parts of the second embodiment except for the above mentioned different points.

Figure 11:
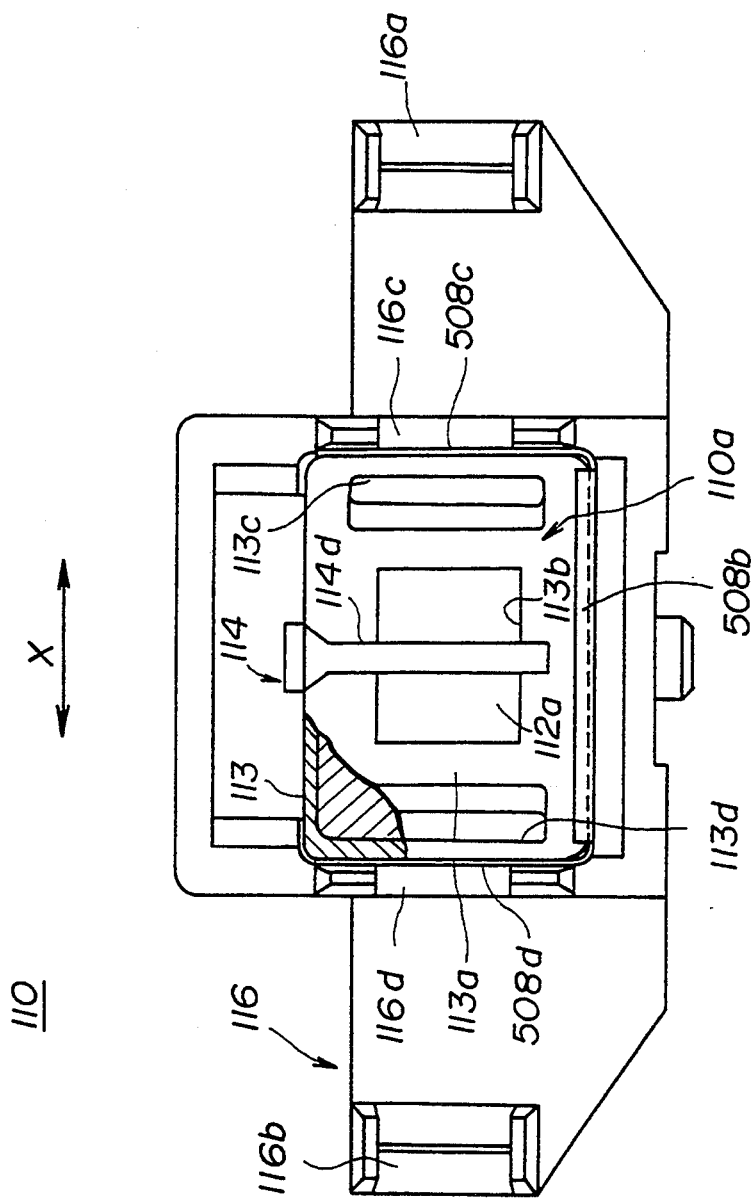
FIG. 11 shows a front view of the magnetic head device of FIG. 10.
Figure 12:
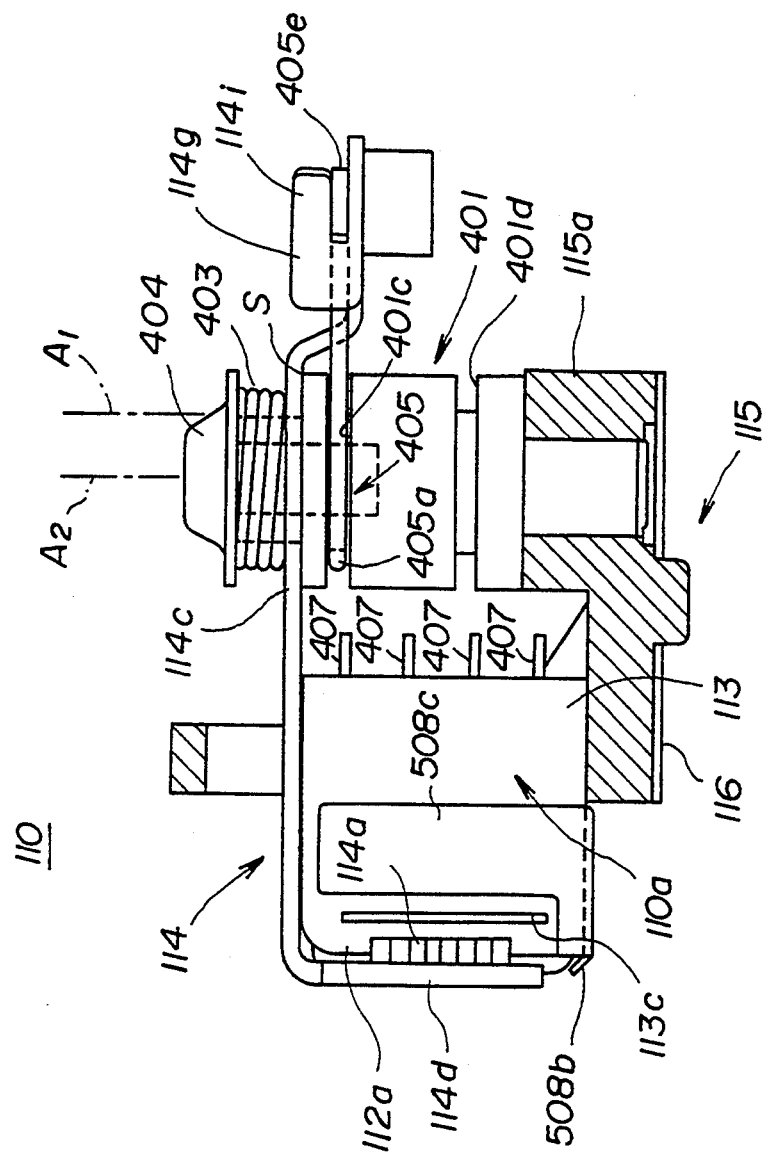
FIG. 12 shows a side, partly sectional view of the magnetic head device of FIG. 10.

The construction of the third embodiment is substantially the same as shown in FIGS. 10 through 12 except for some points described below. A shielding member 117, which will be described below, is omitted in the third embodiment, thus a space, where the shielding member 117 exists, is substituted by a part of the above mentioned core holder 118. The center of curvature of the curved portion 113a can be located at either $A_1$, which is the same as the center of curvature of the curved portion 113a in the second embodiment, or $A_2$, which is the same as the center of pivoting of the lever 114.

In the latter case, where both centers are identical, a radius of pivoting of nose ends of the bristles of the brush 114a is just shorter than the radius $R_2$ of curvature of the curved portion 113a of the shielding cover 113 and the gap portion 112a of the head core 112. Thus, the brush 114a is pressed onto the gap portion 112a and the curved portion 113a with a predetermined pressing force.

The curved portion 113a has stowage cavities 113c and 113d thereon, which cavities are used for stowing the brush 114a therein.

Figure 14:
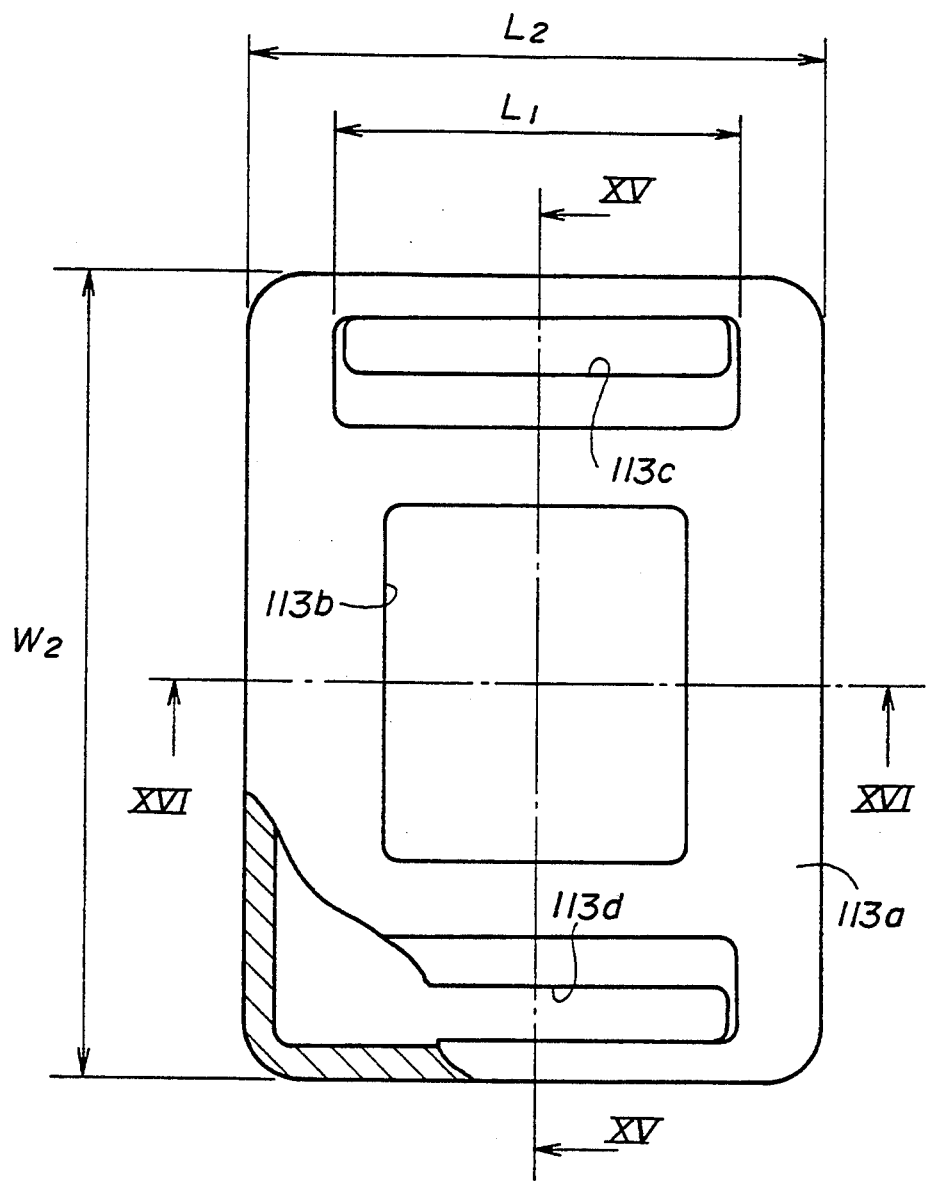
FIG. 14 shows a front, partly sectional view of a shielding cover, which is an essential part of the magnetic head device of the third embodiment.
Figure 15:
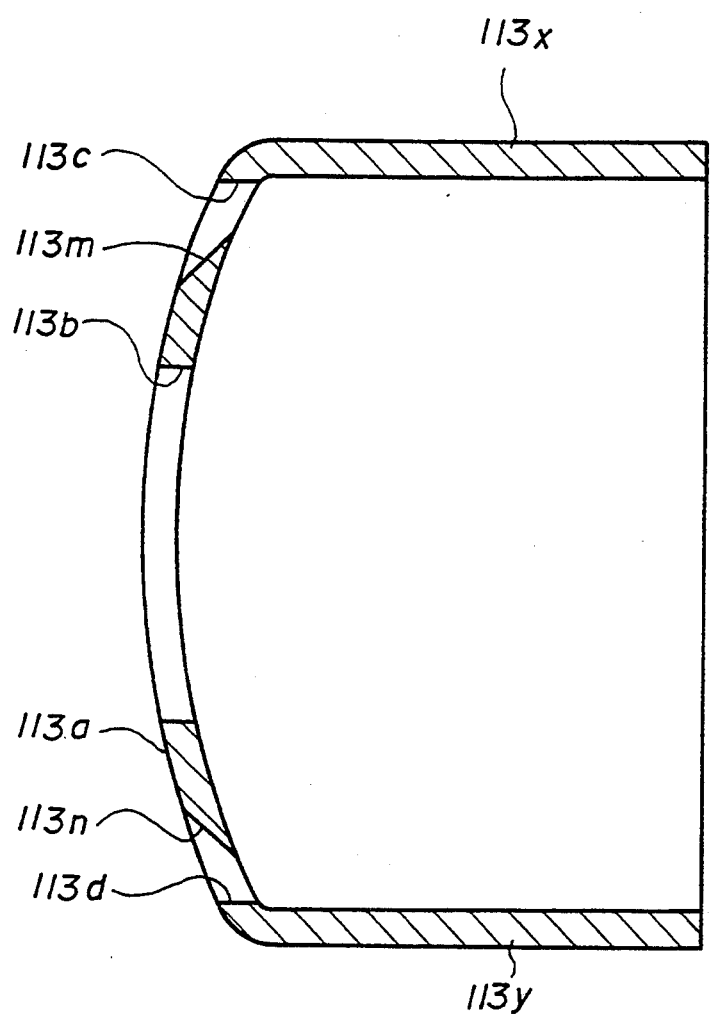
FIG. 15 shows a longitudinal sectional view of the shielding cover of FIG. 14 along a line XV—XV.
Figure 16:
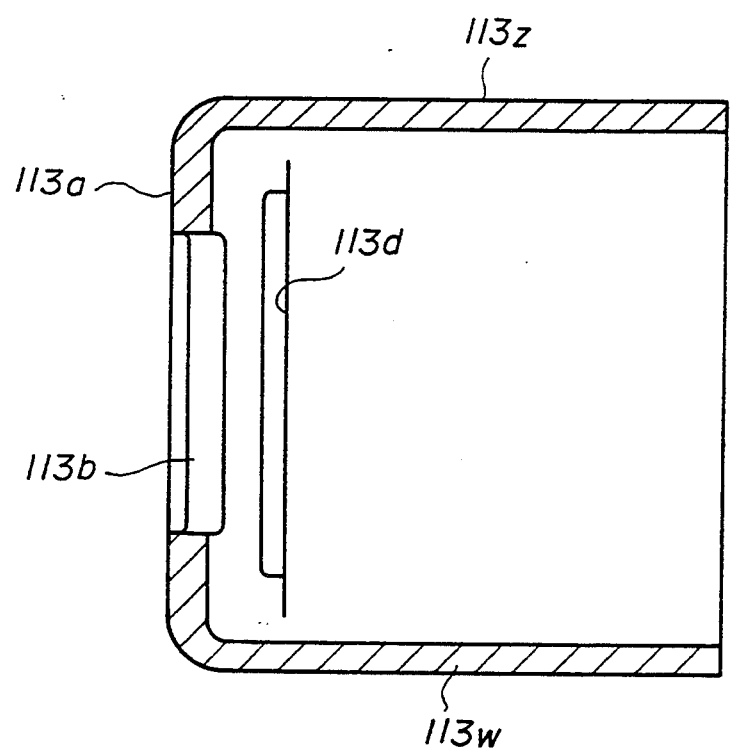
FIG. 16 shows a longitudinal sectional view of the shielding cover of FIG. 14 along a line XVI—XVI.

The shielding cover 113 is made of a magnetic material such as permalloy for example, and is shaped as shown in FIGS. 14 through 16. The curved portion 113a has a shape such as a part of a cylindrical shape is cut so as to form as rectangular shape in an outline thereof. Four rectangular shaped side wall portions 113x, 113y, 113z and 113w, which constitute side walls of the shielding cover 113, are respectively adjacent to four sides of the rectangular of the curved portion 113a.

The above mentioned exposure hole 113b, which has a shape approximately rectangular, is formed in approximately central portion of the curved portion 113a. Further, the stowage cavities 113c and 113d, which comprise holes passing through the curved portion 113a, are formed in both lateral sides of the exposure hole 113b.

Edges 113m and 113n of the stowage cavities 113c and 113d, located in sides of the exposure hole 113b, are made by cutting obliquely as shown in FIG. 15. These constructions of the edges 113m and 113n enable smooth moving of the brush 114a when the brush 114a enters/exits the stowage cavity 113c or 113d while it slides on the edge 113m or 113n. Thus this construction prevents the brush 114a from being damaged when it engages the edge 113m or 113n.

The brush 114a is stowed in the stowage cavity 113c or 113d unless it cleans the gap portion 112a in the third embodiment. Thus shortening of the duration, in which the brush 114a is pressed onto the gap portion 112a or the curved portion 113a, can be realized, thus a life time of the brush 114a can be extended.

In the construction of the above mentioned second embodiment, wherein the brush base 114d gradually becomes near to the curved portion 113a when the brush base 114d moves to the left or right side from the gap portion 112a, a problem occurs as described below. A pressing force, in which the brush 114a is pressed onto the curved portion 113a becomes strong gradually correspondingly to the above mentioned motion of the brush base 114d unless the curved portion 113a has the stowage cavities 113c and 113d. This problem can be overcome by the construction such as the curved portion 113a having the stowage cavities 113c and 113d.

Further, shapes of the stowage cavities 113c and 113d do not need to be limited to those of the embodiment such as shown in FIG. 14, but can be such that vertical lengths $L_1$ in FIG. 14 of the cavities may be elongated so as to be the same as the vertical length $L_2$ of the shielding cover 113. The cavities do not need to be limited to comprise through holes, but they can be such that certain areas of a surface of the curved portion 113a may be only indented by a press forming method or other methods for stowing the brush 114a therein. In the latter case, where the cavities comprise indentations, penetration of the above mentioned induced noise through the cavities can be prevented. Further, leaking of molten plastic through the cavities, when the molten plastic used to fix the head core inside the shielding cover is injected into the shielding cover 113 during the above mentioned assembling process of the magnetic head device, can be prevented.

A particular advantage obtained by the third embodiment over the second embodiment is described below as a result of summarizing. Degrading of cleaning performance by means of the cleaning member (the brush 114a) can be eliminated because a life time of the cleaning member is extended by stowing it in the stowage portion (the stowage cavities 113c and 113d). Thus a magnetic head device having a high reliability can be provided.

Figure 17:
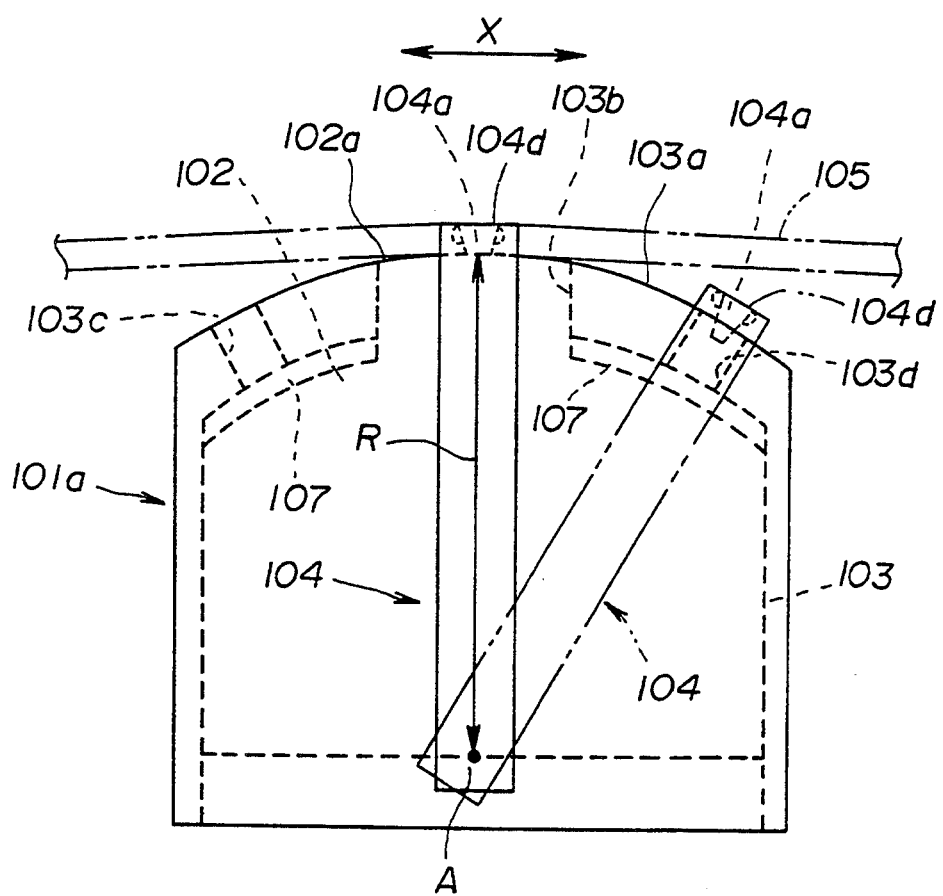
FIG. 17 shows particular features of a magnetic head device of a fourth embodiment according to the present invention.

Particular features of a magnetic head device of a fourth embodiment according to the present invention are described below with reference to FIG. 17. The magnetic head device of the fourth embodiment results from modifying the above mentioned magnetic head device of the third embodiment. A point of difference between the fourth embodiment and the third embodiment is that a shielding member 107 is provided as a mask member which masks holes of the stowage portions 103c and 103d (in case where the stowage portions comprise through holes). However, the shielding member 107 has a shape so that it does not mask the exposure hole 103b.

A description for parts substantially the same as the corresponding parts of the above mentioned third embodiment will be omitted, and the same numerals as those given to the parts of the third embodiment are given to the corresponding parts of the fourth embodiments.

Because such shielding member 107 is provided, the above mentioned induced noise does not penetrate into the magnetic head 101a so that a shielding performance of the shielding cover 103 is ensured even if the stowage portions 103c and 103d comprise through holes. Further, leaking of molten plastic through the stowage portions 103c and 103d, when the molten plastic is injected into the shielding cover 103 during the above mentioned assembling process of the magnetic head device, can be prevented.

A construction of the fourth embodiment is described below with reference to FIGS. 10 through 12, which are also used for describing the second and third embodiments.

The magnetic head device of the fourth embodiment has a shielding member 117, which masks the through holes of the stowage cavities 113c and 113d on a rear surface of the curved portion 113a.

Figures 18A, 18B:
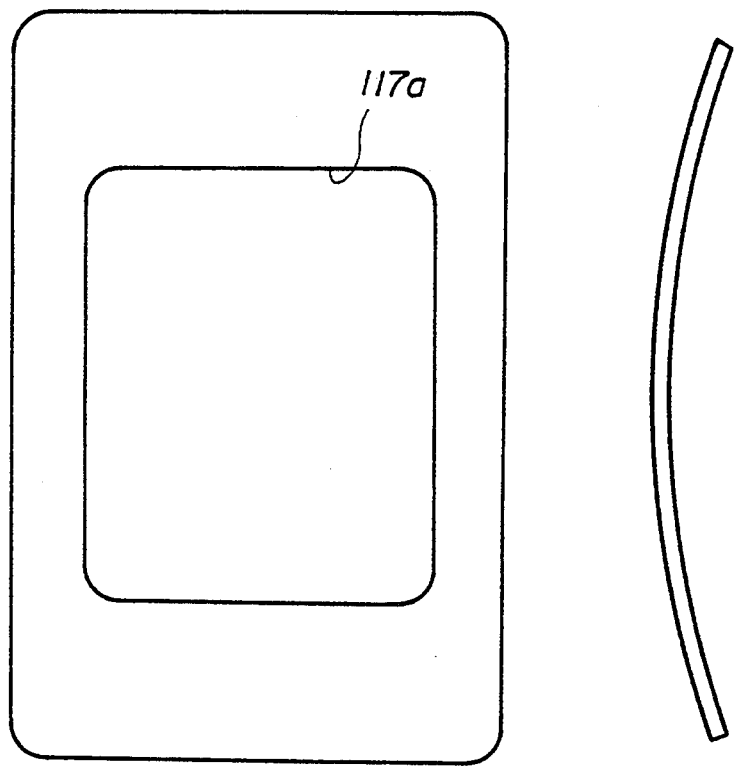
FIGS. 18A (a plan view before bending) and 18B (a side view after bent) show a construction of a shielding member, which is an essential part of the magnetic head device of the fourth embodiment.

Particular points in an assembling process of the magnetic head 110a of this embodiment are described below. The shielding member 117 having a shape as shown in FIGS. 18A and 18B is fitted on the rear surface of curved portion 113a so that the exposure hole 113b coincides with a through hole 117a of the shielding member 117. Then the head core 112, a construction of which is mentioned above, is fitted inside the shielding cover 113 through the above mentioned core holder 118 so that the gap portion 112a is fitted into the exposure hole 113b as mentioned above, then molten plastic is injected into a space inside of the shielding cover 113 except for the shielding member 117, the head core 112, and the core holder 118 so that they are fixed with each other and penetration of undesirable objects into the space is prevented.

Leaking of the molten plastic outside of the shielding cover 113 through the stowage cavities 113c and 113d is prevented by masking them with the shielding member 117 as mentioned above, thus a process such as masking them temporarily with a certain member or removing a leaked plastic can be eliminated.

A description of a process of abrading the gap portion 112a and the curved portion 113a after the above mentioned process of fixing the head core 112 and other members inside the shielding cover 113, which process of abrading is substantially the same as those of the second and third embodiments, is thus omitted.

The shielding member 117 has made of a thin magnetic material such as, for example, a permalloy, which is the same as the shielding cover 113, and 0.05 millimeters of a sheet plate thereof is used. The sheet plate is curved so that it has the same shape as the curved shape of the rear surface of the curved portion 113a.

An advantage of a method such as masking the through holes of the stowage cavities 113c and 113d of the shielding cover 113 as mentioned above, compared with another method such as the stowage cavities 113c and 113d comprising not through holes but the above mentioned indentations formed by, for example, a press forming method, is described below. The difficulty using of a press forming method with a high accuracy on a part constituting such a miniature device as a magnetic head device can be eliminated. Thus, a manufacturing process of the magnetic head device can be simplified, thus realizing cost saving for the magnetic head device.

Advantages of the fourth embodiment are described below. A magnetic head device can be provided wherein a shielding performance of the shielding cover can be ensured even if the stowage portions are provided thereon, further complicated work such as removing the above mentioned leaked molten plastic and wasting of plastic material can be eliminated.

A construction, and features of a pivot portion for the lever 114 of the above mentioned second through fourth embodiments are described below with reference to FIGS. 10 and 19. A metal made shaft 401, having a shape such as approximately cylindrical is fixed on a step portion 115a which is formed on the plastic made head holder 115 and has substantially the same construction as the step portion 37 of the head holder 30 of the above mentioned first embodiment. The magnetic head 110a is fixed on the head holder 115 as mentioned above.

A protrusion portion 401a, which is formed on a top of the shaft 401, and has a shape such as a cylinder, is provided for the shaft 401. A supported portion 114c of the lever 114, a metal made collar 402, and a coil spring (a force-applying means) 403 are respectively loose-fitted on the protrusion portion 401a. A screw hole 401b, which has female screw threads formed inside of it, and a screw 404 is fitted therein.

Figure 19:
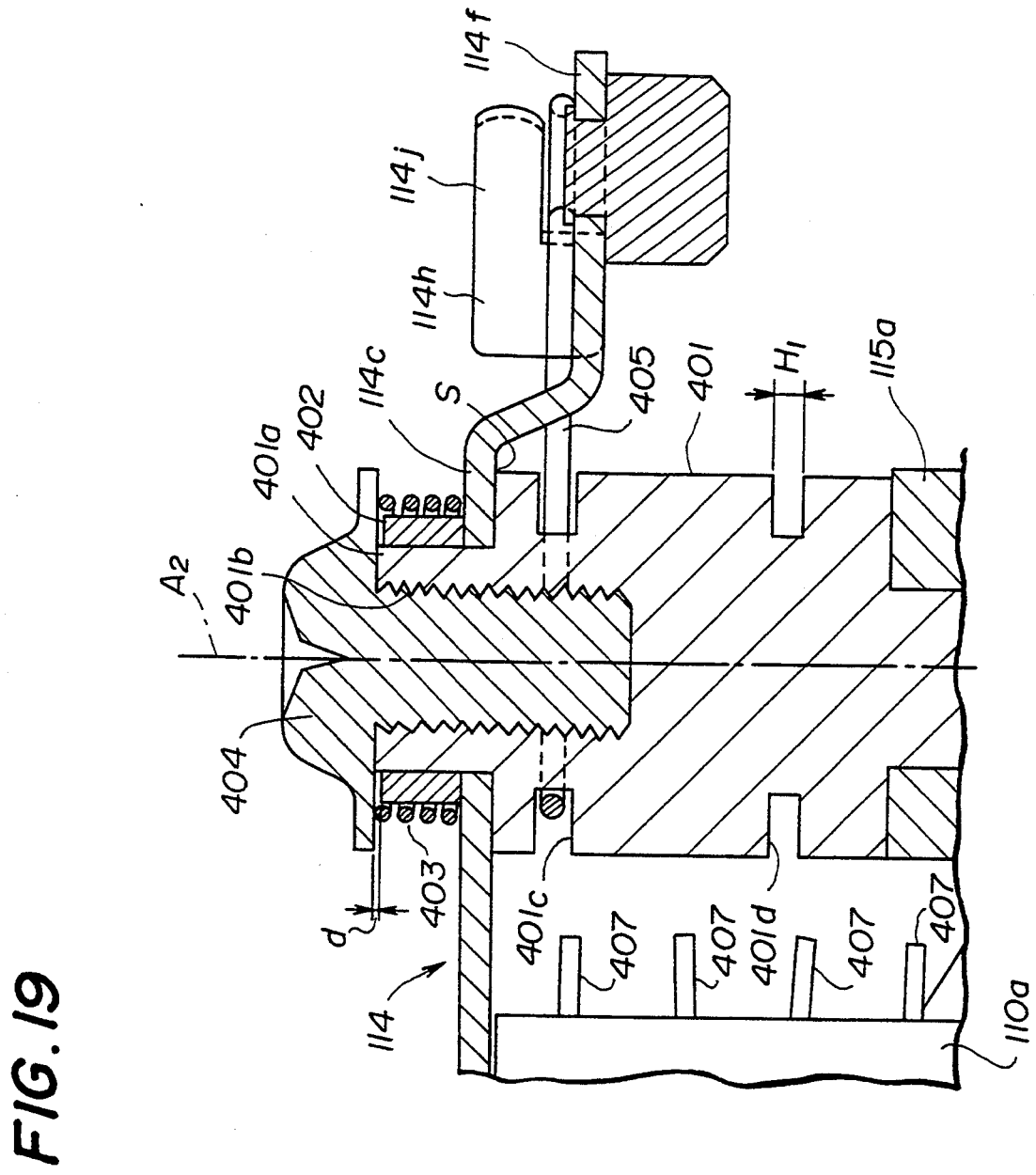
FIG. 19 shows a longitudinal sectional view of a pivot portion, which is an essential portion of the magnetic head device of the second through fourth embodiments.

A height in FIG. 19 of the protrusion portion 401a results from subtracting a clearance "d" from a height resulting from adding a thickness of the supported portion 114c of the lever 114 and a thickness of the collar 402 together. Thus, the lever 114 is movable in a vertical direction (a direction of the axis $A_2$) in FIG. 19 in this clearance "d". On the other hand, the coil spring 403 is located so that it is sandwiched between a bottom surface of a head portion of the screw 404 and the supported portion 114c of the lever 114, and it surrounds a circumference of the collar 402. A resilience of the spring 403 produces a downward (along the direction of the axis $A_2$) pressing force applied on the lever 114 so as to make the lever 114 press onto a side of the magnetic head 110a.

A force pressing the lever 114 downward by means of the spring 403 as mentioned above is transferred into the brush 114a, which is attached on the brush base 114d of the lever 114. This results from that the lever 114 acting as "a lever having a fulcrum S". This force transferred to the brush 114a is produced as a counteraction against a motion of the lever 114 such as the brush base 114d moves upward (along the direction of the axis $A_2$) as a result of a motion of the brush 114a while the brush 114a slides on the gap portion 112a or the curved surface 113a in the above mentioned cleaning operation of the lever 114. The above mentioned fulcrum S is a point on the shaft 401 farthest apart from the gap portion 112a.

The above mentioned force transferred to the brush 114a acts so that the brush 114a is pressed onto the gap portion 112a in the above mentioned cleaning operation of the lever 114. Such force applied to the brush 114a, which is applied when it is needed, that is, when the brush base 114d is moved upward as a result of the motion of the brush 114a in the cleaning operation of the lever 114, ensures an appropriate pressing of the brush 114a onto the gap portion 112a in the cleaning operation. Thus, removal of undesirable objects such as dust or magnetic dust is ensured.

The above mentioned clearance "d", in which the supported portion 114d of the lever 114 can move, is provided as mentioned above and undesirable upward motion of the supported portion 114d is restricted by the resilience of the spring 403. Further, the elasticity of the spring 403 allows a certain displacement of a relative slanting angle of the brush 114a with respect to the gap portion 112a, thus it allows a certain displacement of a distance between the brush base 114d and the gap portion 112a. Thus a smooth pivoting of the lever 114, and a smooth cleaning operation is ensured.

The above mentioned displacement of the relative slanting angle of the brush 114a occurs as a result of slight variation of a friction produced between the brush 114a and the gap portion 112a during sliding thereon.

Two grooves 401c (upper) and 401d (lower), which have the shape of rings, are formed around a circumferential surface of the shaft 401. Spring 405, which acts as a power-transferring means, is fitted in the upper grooves 401c.

Figure 20A:
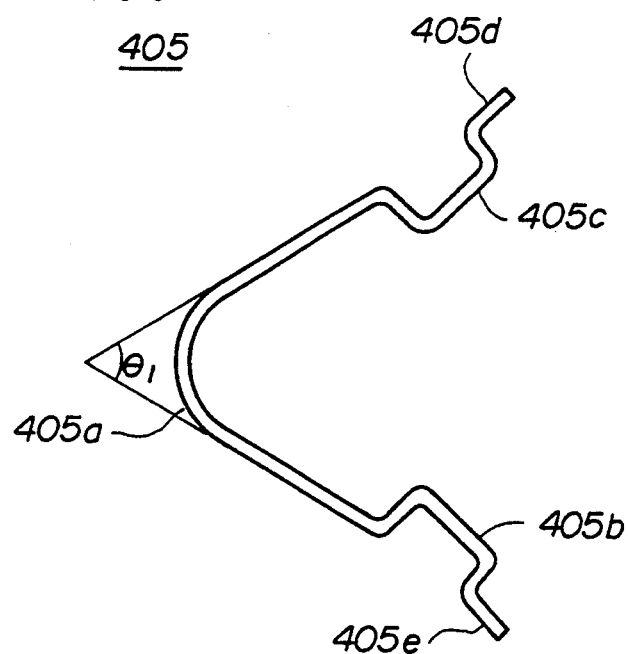
FIGS. 20A and 20B show a construction of a spring, which is an essential part of the above mentioned pivot portion.
Figure 20B:
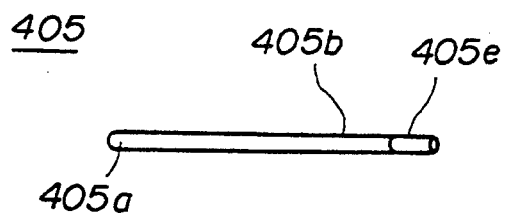

A construction of the spring 405 is described below with reference to FIGS. 20A and 20B. The spring 405 comprises a bent metal made from slender bar (for example, 0.4 millimeters diameter in this embodiment) as shown in FIGS. 20A and 20B, which has a elasticity. The shape of the spring 405 is so that a center portion 405a is bent, further parts (crank portions 405b and 405c) near both ends are respectively bent so as to become nearer inside each other like a crank. A handle portion 114f is provided on the lever 114, extending so as to be located in an opposite side with respect to the supported portion 114c of the brush base 114d. Ribs 114g and 114h are formed in both sides of the handle portion 114f, so as to be bent upward.

The center portion 405a of the spring 405 is fitted in the groove 401c of the shaft 401 and the crank portions 405b and 405c are respectively engaged with the ribs 114g and 114h of the handle portion 114f of the lever 114. The spring 405 has a shape so that it should be deformed by an elasticity thereof so as to be fitted with the shaft 405 and lever 114 as mentioned above. Thus, the crank portions 405b and 405c of the spring 405 respectively apply outward pressing forces onto the ribs 114g and 114h. Further, the ribs 114g and 114h respectively have extension portions 114i and 114j, which are formed by extending outward rearward (rightward in FIG. 19) of rear top ends of the ribs 114g and 114h and are used for preventing the spring 405 from going out upward (along the direction of the axis $A_2$).

An operation of the lever 114 is performed as shown in FIGS. 8A through 8F. A nose portion 405d (left side) or 405e (right side) is driven by being applied of an external driving power. That is, when the lever 114 pivots in a clockwise direction in FIG. 10, the external power is applied to the nose portion 405d in a right direction(downward pressing force $F_1$ in FIG. 10). Thus, the center portion 405a is bent so as to reduce an angle $\Theta_1$ produced in a center of the spring 405, thus the nose portion 405d moves inside, thus the crank portion 405c comes apart from the rib 114h.

This bending of the spring 405 makes the restoring force thereof increase, thus an outward pressing force applied on the other rib 114g by means of the other crank portion 405b increases. Then after the pressing force $F_1$ reaches a predetermined value, the pressing force, which is produced by the resilience of the spring 405, applied on the other rib 114g exceeds a friction produced between the supported portion 114c of the lever 114, and the coil spring 403 and the protrusion portion 401a of the shaft 401. Thus, the lever 114 pivots in the clockwise direction.

Then after the brush base 114d touches the head guide 116d as a result of pivoting of the lever 114 in the clockwise direction, the pivoting of the lever 114 is stopped by means of the head guide 116d. Then the external pressing force $F_1$ should be stopped. However, even if the external pressing force $F_1$ may not stop at the time, this being assumed, the pressing force $F_1$ applied after this time can be absorbed by the elasticity of the spring 405 while the center portion 405a deforms during a certain period. Thus, damaging of the head guide 116d as a result of pressing by means of the brush base 114d can be prevented, and further a displacement of the position of the wind portion 116 is prevented.

An operation of the spring 405 and the handle portion 114f while the lever 114 pivots in a counterclockwise direction is substantially the same as that where the lever 114 pivots in the clockwise direction as mentioned above. Thus, a description for this is omitted.

Summarizing the above mentioned description, the external force $F_1$ or $F_2$ applied to the spring 405 first affect the spring 405 so as to deform it. Thus, even if the pivoting operation of the lever 114 may be braked as a result of, for example, a increasing of a friction produced between the brush 114a, and the gap portion 112a or the curved portion 113a, a shock caused by this braking of the pivoting operation can be absorbed by the elasticity of the spring 405 while it deforms. Further, when the brush 114a escapes a side of the head guide 116c or 116d, and even if the brush base 114d touches the head guide 116c or 116d, a shock caused by this touching can be absorbed by this elasticity of the spring 405. Thus, damage of the lever 114 or the wing portion 116 does not occur.

A construction of the magnetic head device according to the present invention does not need to be limited such that the lever 114 is supported by the head holder 115. However, a construction such that the lever 114 is directly supported by the magnetic head 110a is allowed. In this construction, by providing a power-transferring means such as the spring 405, a shock caused by the external power for driving the lever 114 is absorbed thereby, thus a displacement of a position of the magnetic head 110a caused by the shock is prevented.

A grounding member 406 is press-fitted into the groove 401d of the shaft 401. A problem may occur if the lever 114 has made of metal because a metal lever 114 can not be grounded because the head holder 115 is made of plastic material. If the metal lever 114 cannot be grounded, the problem occurs that electrical or magnetic noise may be induced on the lever 114 from other devices in a recording and/or reproducing apparatus, which applies the magnetic head device. Another problem may occur such that an electrostatic charge may be stored in the lever 114 as a result of a sliding friction produced between the brush base 114d and a magnetic tape. Such electrostatic charge may degrade a performance of the magnetic head 110a. Thus grounding of the metal lever 114 is needed.

Figure 21A:
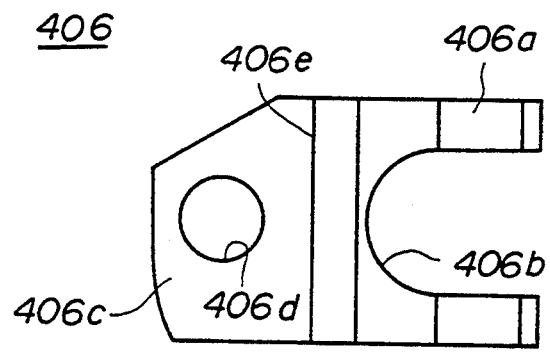
FIGS. 21A and 21B show a construction of a grounding member, which is associated with the above mentioned pivot portion.
Figure 21B:
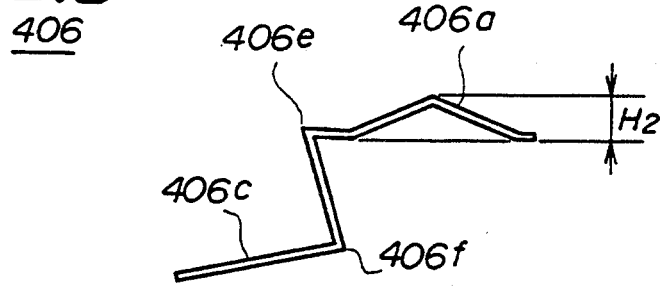

The grounding member 406 has been made of thin copper sheet plate (for example, 0.2 millimeters in this embodiment), which is cut and bent as shown in FIGS. 21A and 21B. A copper sheet plate shaped approximately rectangularly is bent in two positions 406e and 406f on an about central portion thereof to produce a sharp angle so as to form the shape "Z", further a part of one side portion thereof is bent so as to protrude to shape "V" so that a press-fitted portion 406a is formed. A "U" shaped cut-out portion 406b is further formed on the press-fitted portion 406a by cutting out it. Further, a screw hole 406d, which is a through hole, is formed on a flat portion 406c, which is another part of the grounding member 406 with respect to the above mentioned two central bent portions.

The cut-out portion 406b of the press-fitted portion 406a is press-fitted into the grooves 401d of the shaft 401. The protrusion of the press-fitted portion 406a is so that a height $H_2$ of the protrusion of the press-fitted portion 406a is longer than a width $H_1$ of the groove 401d. Thus, the press-fitted portion 406a deforms by an elasticity thereof when it is press-fitted, thus a resilience thereof prevents it from escaping easily from the groove 401d. Because of such construction where the grounding member 406 is temporarily fixed in the shaft 401, losing the grounding member 406 is prevented until the above mentioned flat portion 406c is fixed by a screw as described below.

The flat portion 406c is placed on a fixing plate 115b, which is formed on a rear side of the head holder 115 by extending backward, so that the screw hole 406d coincides with a right side fixing hole 115c, which is formed on the fixing plate 115b, in an assembling stage of the magnetic head device 110. Before the grounding member 406 is placed on the fixing plate 115b, a grounding tag, which is provided on one end of a lead, is placed on the fixing plate 115b. The lead has a substantially the same shape as the lead 19 of the first embodiment as shown in FIG. 1. The lead is used for connecting terminals 407, which are provided on a rear surface of the magnetic head 110a, and other circuits of a recording and/or reproducing apparatus, which applies the magnetic head device 110. The grounding tag thereof is placed on the fixing plate 115b when the lead is connected to the terminals 407.

Further, when the magnetic head device 110a is integrated into the recording and/or reproducing apparatus, the fixing plate 115b is fixed on a body of the recording and/or reproducing apparatus by means of screws, which respectively pass through the both fixing holes 115c and 115d in FIG. 10, and then the flat portion 406c of the grounding member 406 and the grounding tag are fixed together onto the fixing plate 115b at the same time so that the shaft 401 and lever 114 are grounded together through the grounding tag of the lead by connecting to the grounding circuit of the recording and/or reproducing apparatus.

A material of the head holder 115 does not need to be limited to comprise plastic, but a head holder made of metal also is allowed. Another method is also allowed such that a rear side of the magnetic head 110a is extended backward so as to be fixed to the shaft 401 with the lever 114 thereon directly without using the head holder 115. The grounding member 406 is not needed in these cases where the metal made head holder 115 is used or the head holder 115 is eliminated.

Advantages of the above mentioned construction of the pivot portion as shown in FIGS. 10, 19 through 21B, are summarized below. Because a smooth pivoting operation of the lever 114 can be ensured, the cleaning operation for cleaning of the gap portion 112a by means of the lever 114 can be ensured and minimizing of the power needed for driving the lever 114 can be realized.

Further, because a displacement of the position of the magnetic head or damage thereof can be prevented, a high reliability of the magnetic head device can be realized. Furthermore, preventing of penetration of an induced noise through the pivot portion can be ensured by a simple construction such as grounding member.

Figure 23A:
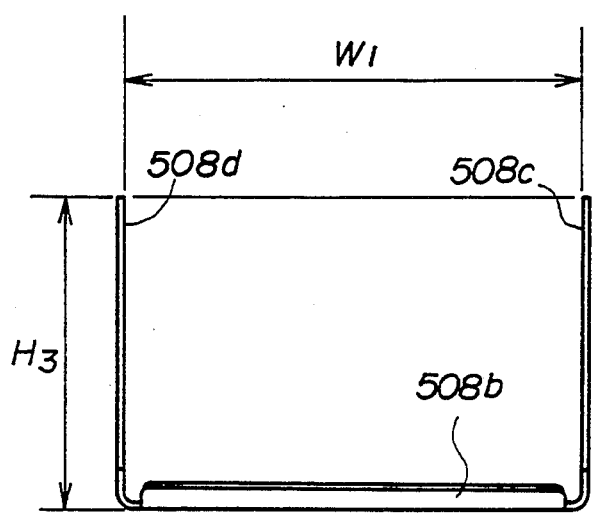
FIGS. 23A through 23C show a construction of a magnetic dust catching shelf, which is an essential part of the magnetic head device of the second through fourth embodiments.
Figure 23B:
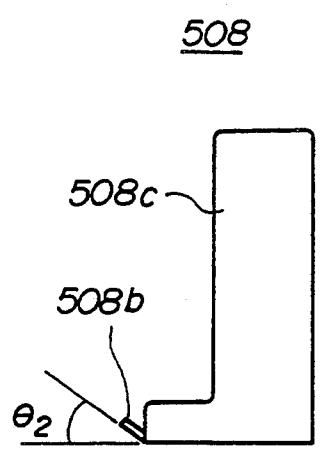
Figure 23C:
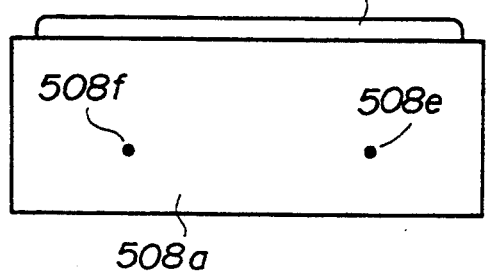

A construction of a magnetic dust catching shelf 508 serving as an object-catching means is described below with reference to FIGS. 23A through 23C. The shelf 508 comprises thin sheet metal (for example, 0.15 millimeters in this embodiment), which is cut and bent in a manufacturing stage thereof. A catching portion 508b is formed on a front end of a rectangular shaped base portion 508a, by bending frontward (leftward in FIG. 23B) upward (in FIG. 23B) so as to slant to produce approximately 45 degrees angle of $\Theta_2$. Both side wall portions 508c and 508d are formed on both sides of the base portion 508a, by extending upward. An inner width $W_1$ is determined to be approximately the same as the outer width $W_2$ in FIG. 14 of the shielding cover 113. A height $H_3$ of the side wall portions 508c and 508d is determined to be slightly shorter than the height $L_2$ of the shielding cover 113. Further, two protrusions 508e and 508f are formed near a right and left ends on a bottom surface (in FIG. 23A) of the base portion 508a, each of which has a slight height (for example, 0.05 millimeters in this embodiment).

The shielding cover 113, in which the head core 112 and associated members are fixed, is fitted inside the shelf 508 in an assembling state thereof so that a bottom surface of the shielding cover 113 touches onto a top surface of the base portion 508a; both side walls of the shielding cover 113 respectively touch onto inner surfaces of the side wall portions 508c and 508d; and a central portion of a border line of the base portion 508a and the catching portion 508b touches approximately a central portion of a bottom edge line of the curved portion 113a of the shielding cover 113.

Figure 22:
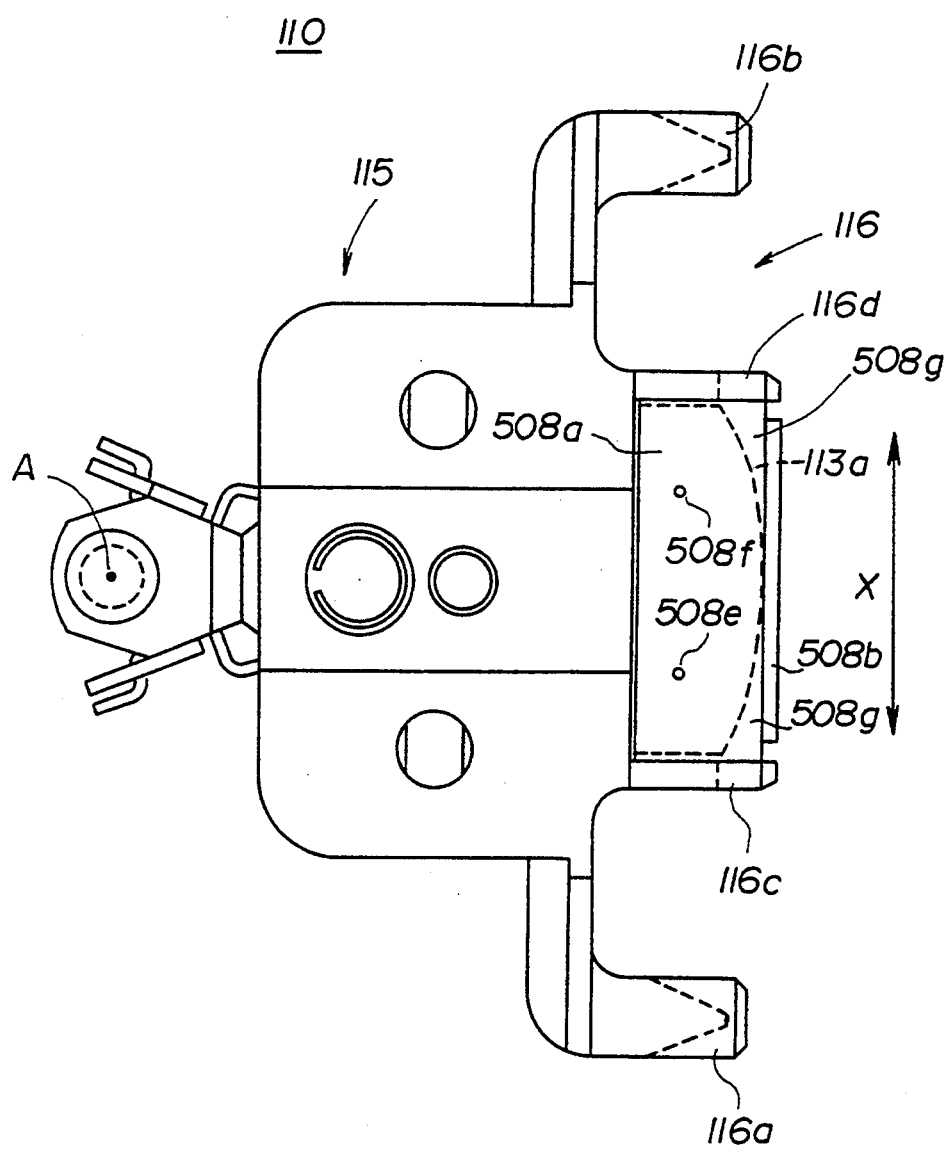
FIG. 22 shows a bottom view of the magnetic head device of the second through fourth embodiments.

Then after fitting the shielding cover into the shelf 508, because the curved portion 113a has a shape of a partly cylindrical shape as mentioned above, extending portion 508g, which is a part of the base portion 508a, is formed by extending frontward from the bottom edge line of the curved surface 113a in both sides as shown in FIG. 22. Widths of the extending portion 508g in a frontward (rightward in FIG. 22) direction are the longer where positions are farther apart from the central portion of the curved portion 113a. The above mentioned width of the extending portion 508g is approximately zero in the central portion of the curved portion 113a.

Then the above mentioned protrusions 508e and 508f are electrically welded onto the bottom surface of the magnetic head 110a, that is, the bottom surface of the shielding cover 113, so that the shelf 508 is fixed on the magnetic head 110a. Then after fixing the shelf 508 onto the magnetic head 110a, the magnetic head 110a with the shelf 508 is fixed to the head holder 115 by adhering.

An advantage resulting from integrating the magnetic dust catching shelf 508 into the magnetic head device is described below. Undesirable objects such as dust or magnetic dust, which have been removed by the cleaning operation of the lever, then fall by gravity, then are caught by the extending portion 508g and catching portion 508b of the shelf 508. The objects once caught by these portions 508g and 508b do not fall therefrom because the catching portion 508b serves as a dam to prevent it.

A problem such that the objects caught by the shelf 508 may fall therefrom when a quantity of the objects exceeds a capacity of the shelf 508, can not occur. This is because a quantity of such objects is very small, thus it will not exceed the capacity of the shelf 508, before a life time of the magnetic head 110a elapses.

Further, a shielding effect can be obtained by means of the shelf 508 if the shelf comprises a magnetic material such as a permalloy, thus penetration of the induced noise into the magnetic head 110a can be prevented.

Because of the provision of the magnetic dust catching shelf 508, the falling of such objects into other systems in a recording and/or reproducing apparatus, which applies the magnetic head device, resulting in the degradation of performance of the recording and/or reproducing apparatus, can be prevented. Thus, another system for depositing such objects is not needed.

Further, the present invention is not limited to the above described embodiments, and variations and modifications may be made without departing from the scope of the present invention.

What is claimed is:

1. A magnetic head device comprising:
  a magnetic head having an exposed surface with a portion on which a magnetic recording medium slides;
  a head holder having a head holding portion for fixing said magnetic head in said head holder so that it does not move with respect thereto, said head holder having at least one guiding portion located at a side of, and spaced apart from, said magnetic head fixed by said head holding portion, said guiding portion guiding a running course of said magnetic recording medium, said head holding portion and guiding portion being formed as integral portions of said head holder;
  cleaning means mounted on said head holder for pivotal movement with respect to said head holder about an axis normal to the running course of the magnetic recording medium, said cleaning means being appliable to said magnetic head surface portion on which the magnetic tape slides by said pivotal movement to clean said surface portion; and
  said magnetic head having stowage means along said exposed surface in which said cleaning means may be located to remove said cleaning means from the running course of the magnetic tape.

2. The magnetic head device according to claim 1 wherein said stowage means comprises at least one recess on said exposed surface of said magnetic head spaced from said surface portion in a direction along the running course of the magnetic recording medium.

3. The magnetic head device according to claim 2 wherein said stowage means comprises a cavity formed in said exposed surface of said magnetic head.

4. The magnetic head device according to claim 1, wherein said cleaning means is driven by means of a driving system, said driving system also driving said magnetic recording medium so that said recording medium runs on said sliding surface of said magnetic head.

5. The magnetic head device according to claim 1, wherein:

said cleaning means has a cleaning member for sliding so as to clean said sliding surface of said magnetic head; and said sliding surface of said magnetic head has at least one stowage portion of said stowage means located in a position other than said sliding portion, said stowage portion being used for stowing therein at least a part of said cleaning member which comes into contact with said sliding surface during action of said cleaning member.

6. The magnetic head device according to claim 5, wherein:

said magnetic head further has a shielding cover covering said head, said shielding cover including a part of said sliding surface, said stowage portion being an opening made on a part of said shielding cover, and said magnetic head further has a mask member for masking said opening.

7. The magnetic head device according to claim 6, further comprising force-applying means formed of elastic material for applying force comprising an elastic force arising from said elastic material to said cleaning member of said cleaning means so as to make said cleaning member press on said sliding surface of said magnetic head.

8. The magnetic head device according to claim 1, further comprising power-transferring means for transferring power from outside to said cleaning means through said power-transferring means as a result of said power-transferring means being driven by a driving member, said power-transferring means being made of an elastic material, said cleaning means being driven by said power, and said power-transferring means made of elastic material reducing shock, which shock may be applied by said driving member and may be transferred to said magnetic head via said cleaning means.

9. The magnetic head device according to claim 1, further comprising an object receptacle for receiving an object falling from said sliding surface of said magnetic head as a result of said object being removed from said sliding surface by said cleaning member sliding on said sliding surface, said object receptacle being located so that an object falling due to gravity, from said sliding surface lands in said object receptacle.

* * * * *

UNITED STATES PATENT AND TRADEMARK OFFICE
CERTIFICATE OF CORRECTION

PATENT NO. : 5,383,076
DATED : January 17, 1995
INVENTOR(S) : Saito, et al

It is certified that error appears in the above-indentified patent and that said Letters Patent is hereby corrected as shown below:

CLAIM 5, Col. 23, Line 24, after the word "during" insert ---the cleaning---

Signed and Sealed this

Second Day of May, 1995

Attest:

BRUCE LEHMAN

Attesting Officer

Commissioner of Patents and Trademarks